United States Patent
Yi

(10) Patent No.: US 10,951,377 B2
(45) Date of Patent: Mar. 16, 2021

(54) METHOD AND DEVICE FOR ALLOCATING RESOURCES IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/609,731

(22) PCT Filed: May 2, 2018

(86) PCT No.: PCT/KR2018/005067
§ 371 (c)(1),
(2) Date: Oct. 30, 2019

(87) PCT Pub. No.: WO2018/203650
PCT Pub. Date: Nov. 8, 2018

(65) Prior Publication Data
US 2020/0067676 A1 Feb. 27, 2020

Related U.S. Application Data

(60) Provisional application No. 62/492,933, filed on May 1, 2017, provisional application No. 62/529,448, filed
(Continued)

(51) Int. Cl.
*H04W 72/04* (2009.01)
*H04L 5/00* (2006.01)

(52) U.S. Cl.
CPC ............ *H04L 5/0053* (2013.01); *H04L 5/001* (2013.01); *H04L 5/0048* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2014/0126496 | A1 | 5/2014 | Sayana et al. |
| 2015/0256307 | A1* | 9/2015 | Nagata ................. H04W 28/22 370/328 |

(Continued)

FOREIGN PATENT DOCUMENTS

| EP | 3471306 | 4/2019 |
| JP | 2014072694 | 4/2014 |

(Continued)

OTHER PUBLICATIONS

Huawei et al., R1-143908, Clarifications on PDSCH and EPDCCH rate matching for CSI-RS in DRS, 3GPP TSG RAN WG1 #78bis, (Sep. 27, 2014) See section 2. (Year: 2014).*

(Continued)

*Primary Examiner* — Mansour Oveissi
(74) *Attorney, Agent, or Firm* — Lee, Hong, Degerman, Kang & Waimey PC

(57) ABSTRACT

Provided are a method and device for rate matching in a wireless communication system. More specifically, provided is a method for rate matching by user equipment (UE), in new radio access technology (NR), under various circumstances. As an example, UE receives a configuration for the rate matching either UE-specifically or cell-specifically, and, if the configuration is received UE-specifically, the rate matching is performed only on unicast data, and, if the configuration is received cell-specifically, the rate matching is performed on broadcast data and the unicast data.

11 Claims, 13 Drawing Sheets

Related U.S. Application Data on Jul. 6, 2017, provisional application No. 62/531,861, filed on Jul. 12, 2017, provisional application No. 62/548,981, filed on Aug. 23, 2017, provisional application No. 62/567,130, filed on Oct. 2, 2017, provisional application No. 62/582,835, filed on Nov. 7, 2017, provisional application No. 62/585,531, filed on Nov. 13, 2017, provisional application No. 62/616,454, filed on Jan. 12, 2018.

(56) References Cited

U.S. PATENT DOCUMENTS

| | | | |
|---|---|---|---|
| 2016/0014778 A1* | 1/2016 | Zhou | H04L 5/0094 370/252 |
| 2016/0127095 A1 | 5/2016 | Chen et al. | |
| 2016/0330011 A1* | 11/2016 | Lee | H04L 5/0066 |
| 2017/0265166 A1* | 9/2017 | Hosseini | H04L 27/2601 |

FOREIGN PATENT DOCUMENTS

| | | | | |
|---|---|---|---|---|
| JP | 2016504789 | | 2/2016 | |
| KR | 20150040938 | | 4/2015 | |
| KR | 20150040938 A | * | 4/2015 | H04L 5/0035 |
| KR | 20150083103 | | 7/2015 | |
| KR | 20150083103 A | * | 7/2015 | H04B 7/024 |
| KR | 101727579 | | 4/2017 | |
| KR | 101727579 B1 | * | 4/2017 | H04L 5/0044 |
| WO | 2016117984 | | 7/2016 | |

OTHER PUBLICATIONS

Intel Corporation, R1-1611974, Study of DM-RS pattern for NR, 3GPP TSG RAn WG1 #87, 3GPP (Nov. 6, 2016) See section 2, and figure 1. (Year: 2016).*
PCT International Application No. PCT/KR2018/005067, International Search Report dated Aug. 21, 2018, 4 pages.
Ericsson, "Remaining Details on PDSCH Rate Matching," 3GPP TSG-RAN WG1 #87, R1-1612675, Nov. 2016, 6 pages.
Huawei, HiSilicon, "Rate matching for Beanformed CSI-RS," 3GPP TSG-RAN WG1 #87, R1-1612819, Nov. 2016, 5 pages.
European Patent Office Application Application No. 18794613.2, Search Report dated Feb. 12, 2020, 12 pages.
Huawei, et al., "Clarifications on PDSCH and EPDCCH rate matching for CSI-RS in DRS", 3GPP TSG RAN WG1 Meeting #78bis, R1-143908, Oct. 2014, 2 pages.
LG Electronics, "Discussion on rate matching", 3GPP TSG RAN WG1 Meeting NR Ad-Hoc #2, R1-1710280, Jun. 2017, 4 pages.
LG Electronics, "Summary on views on PDSCH and PUSCH rate matching", 3GPP TSG RAN WG1 Meeting NR#3, R1-1716773, Sep. 2017, 6 pages.
Korean Intellectual Property Office Application No. 10-2019-7032193, Office Action dated Apr. 23, 2020, 5 pages.
Japan Patent Office Application No. 2019-560253, Office Action dated Oct. 13, 2020, 3 pages.

* cited by examiner

METHOD AND DEVICE FOR ALLOCATING RESOURCES IN WIRELESS COMMUNICATION SYSTEM

CROSS-REFERENCE TO RELATED APPLICATIONS

This application is the National Stage filing under 35 U.S.C. 371 of International Application No. PCT/KR2018/005067, filed on May 2, 2018, which claims the benefit of U.S. Provisional Application No. 62/492,933, filed on May 1, 2017, 62/529,448, filed on Jul. 6, 2017, 62/531,861, filed on Jul. 12, 2017, 62/548,981, filed on Aug. 23, 2017, 62/567,130, filed on Oct. 2, 2017, 62/582,835, filed on Nov. 7, 2017, 62/585,531, filed on Nov. 13, 2017, and 62/616,454, filed on Jan. 12, 2018, the contents of which are all hereby incorporated by reference herein in their entireties.

TECHNICAL FIELD

The present disclosure relates to wireless communication and, more particularly, to a method and device for allocating resources in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more communication devices require great communication capacity, a demand with respect to enhanced mobile broadband (eMBB) communication is spotlighted. Further, there is a main issue that a plurality of devices and objects are connected so that large machine type communication (MTC) providing various services regardless of time and location to be considered as next generation communication. Further, ultra-reliable and low latency communication (URLLC) considering service/user equipment (UE) sensitive to reliability and delay has been discussed. As described above, introduction of a next generation radio access technology considering eMBB, a large MTC, URLLC has been discussed. For convenience of the description, such new radio access technology may refer to a new radio access technology (NR). A wavelength is short in a millimeter wave (mmW) so that a plurality of antennas may be installed at the same area. For example, the wavelength is 1 cm at a 30 GHz band, total 100 antenna elements may be installed in a secondary arrangement form at 0.5λ (wavelength) on a panel of 5×5 cm2. Accordingly, a plurality of antenna elements is used at the mmW band so that a beamforming gain is increased to increase coverage or a throughput.

In this case, if a transceiver is included to adjust transmission power and a phase by antenna element, an independent beamforming is possible by frequency resource. However, if transceivers are installed at 100 antenna elements, respectively, the effectiveness is deteriorated in a cost side. Accordingly, it is considered that a plurality of antenna elements are mapped to one transceiver and a direction of a beam are adjusted to an analog phase shifter. Such an analog beamforming scheme can create only one beam direction so that a frequency selective beamforming cannot be performed.

A hybrid beamforming having B transceivers having the number less than Q antenna elements in an intermediate form of digital beamforming and analog beamforming may be considered. In this case, although the number of direction of the beam capable of being simultaneously transmitted is changed according to a connection scheme of B transceivers and Q antenna elements, the number of direction of the beam is limited to less than B.

According to unique characteristics of NR, a structure of a physical channel and/or related characteristics of NR may be different from those of an existing LTE. For an efficient operation of the NR, various schemes may be suggested.

SUMMARY

The present disclosure provides a method and apparatus for allocating resources in a wireless communication system. The present disclosure discusses a resource allocation and downlink control information (DCI) design considering bandwidth adaptation and broadband/narrowband operation in NR. More particularly, the present disclosure discusses a rate matching in NR.

In an aspect, a method for performing, by a user equipment (UE), a rate matching in a wireless communication system is provided. The method includes receiving a configuration for the rate matching UE-specifically or cell-specifically, if the configuration is received UE-specifically, performing the rate matching only on unicast data, and if the configuration is received cell-specifically, performing the rate matching on the unicast data and broadcast data.

In another aspect, a user equipment (UE) in a wireless communication system is provided. The UE includes a memory, a transceiver, and a processor coupled to the memory and the transceiver. The processor is configured to control the transceiver to receive a configuration for a rate matching UE-specifically or cell-specifically, if the configuration is received UE-specifically, perform the rate matching only on unicast data, and if the configuration is received cell-specifically, perform the rate matching on the unicast data and broadcast data.

In NR, a rate matching can be efficiently performed.

DETAILED DESCRIPTION

Hereinafter, the following description will be made while focusing on an NR based wireless communication system. However, the present disclosure is limited thereto. The present disclosure is applicable to another wireless communication system, for example, 3rd generation partnership project (3GPP) long-term evolution (LTE)/LTE-A (advanced) or institute of electrical and electronics engineers (IEEE) having the same characteristic to be described below.

A 5G system is a 3GPP system including a 5G access network (AN), a 5G core network (CN) and user equipment (UE). The UE may be called other terms such as a mobile station (MS), a user terminal (UT), a subscriber station (SS), or a wireless device. A 5G AN is an access network including a non-3GPP access network and/or a new generation radio access network (NG-RAN) connected to the 5G CN. The NG-RAN is a wireless access network having a common characteristic connected to the 5G CN and for supporting at least one of following options.

1) Independent type new radio (NR).
2) The NR is an anchor having E-UTRA extension.
3) Independent type E-UTRA.
4) An E-UTRA is an anchor having NR extension.

Figure 1:
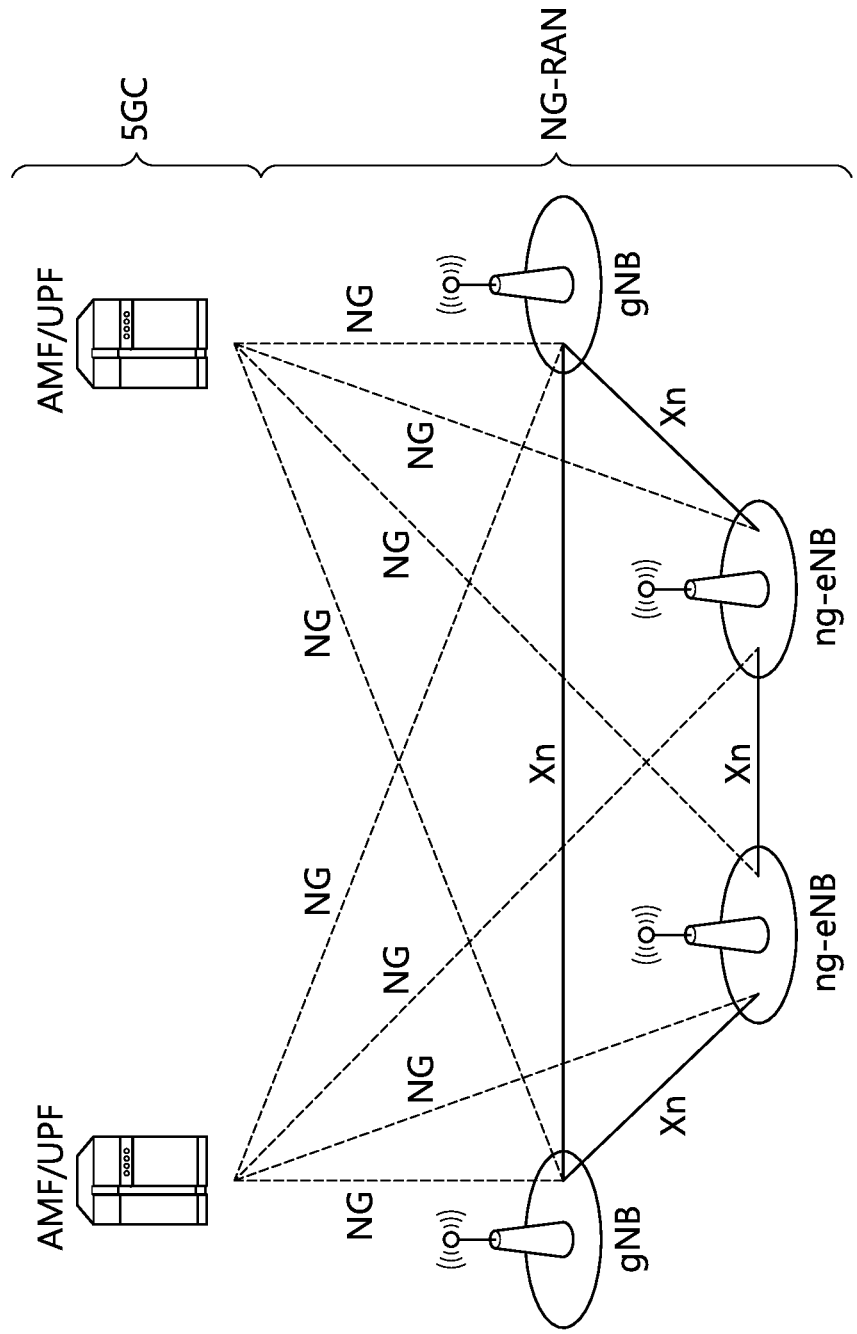
FIG. 1 shows a NG-RAN architecture.

FIG. 1 shows a NG-RAN architecture. Referring to FIG. 1, the NG-RAN includes at least one NG-RAN node. The NG-RAN node includes at least one gNB and/or at least one ng-eNB. A gNB/ng-eNB may be called a base station (BS) or an access point. A gNB provides an NR user plane and a control plane protocol termination toward the UE. An ng-eNB provides an E-UTRA user plane and a control plane protocol termination toward the UE. A gNB is connected with an ng-eNB through an Xn interface. The gNB and the ng-eNB are connected with the 5G CN through the NG interface. In detail, the gNB and the ng-eNB are connected with an access and mobility management function (AMF) through an NG-C interface, and are connected with a user plane function (UPF) through an NG-U interface.

The gNB and/or ng-eNB host the following functions:
Functions for radio resource management: Radio bearer control, radio admission control, connection mobility control, dynamic allocation of resources to UEs in both uplink and downlink (scheduling);
Internet protocol (IP) header compression, encryption and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the uplink;
Session management;
Support of network slicing;
Quality of service (QoS) flow management and mapping to data radio bearers;
Support of UEs in RRC_INACTIVE state;
Distribution function for non-assess stratum (NAS) messages;
Radio access network sharing;
Dual connectivity;
Tight interworking between NR and E-UTRA.

The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.

The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);
Downlink packet buffering and downlink data notification triggering.

The SMF hosts the following main functions:
Session management;
UE IP address allocation and management;
Selection and control of UP function;
Configures traffic steering at UPF to route traffic to proper destination;
Control part of policy enforcement and QoS;
Downlink data notification.

In the NR, a plurality of orthogonal frequency division multiplexing (OFDM) numerologies may be supported. A plurality of numerologies may be mapped to different subcarrier spacings, respectively. For example, a plurality of numerologies mapped to various subcarrier spacings of 15 kHz, 30 kHz, 60 kHz, 120 kHz, and 240 kHz may be supported.

Downlink (DL) transmission and uplink (UL) transmission are configured in a frame having a length of 10 ms in the NR. One frame includes 10 subframes having a length of 1 ms. Each frame is divided into two half-frames having the same size. A half-frame 0 is configured by subframes 0-4. A half-frame 1 is configured by subframes 5-9. In a carrier, one frame group is included on UL and one frame group is included on DL.

A slot is configured by each numerology in the subframe. For example, in a numerology mapped to a subcarrier spacing of 15 kHz, one subframe includes one slot. In a numerology mapped to a subcarrier spacing of 30 kHz, one subframe includes two slots. In a numerology mapped to a subcarrier spacing of 60 kHz, one subframe includes four slots. In a numerology mapped to a subcarrier spacing of 120 kHz, one subframe includes eight slots. In a numerology mapped to a subcarrier spacing of 240 kHz, one subframe includes 16 slots. The number of OFDM symbols per slot may maintain 14. A start point of a slot in the subframe may be arranged in a start point of an OFDM symbol in time.

In the slot, the OFDM symbol may be classified into a DL symbol, a UL symbol, or a flexible symbol. In the DL slot, it may be assumed that DL transmission occurs in only a DL symbol or a flexible symbol. In the UL slot, the UE may perform UL transmission in only the UL symbol or the flexible symbol.

Figure 2:
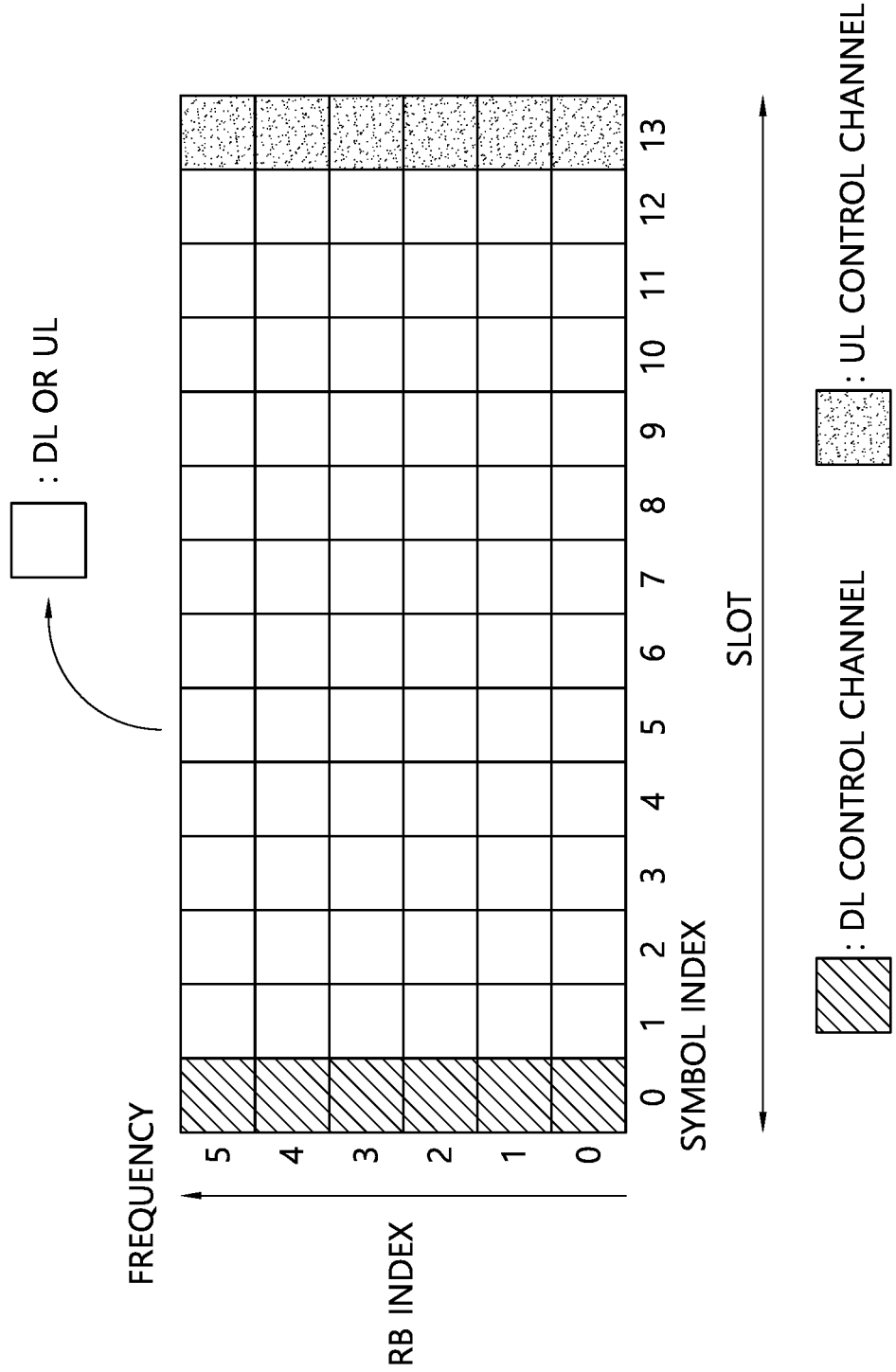
FIG. 2 shows an example of a subframe structure in an NR.

FIG. 2 shows an example of a subframe structure in an NR. The subframe structure of FIG. 2 may be used in a time division duplex (TDD) of the NR in order to minimize transmission delay of data. The subframe structure of FIG. 2 may be called a self-contained subframe structure.

Referring to FIG. 2, a first symbol of a subframe includes a DL control channel, and a final symbol includes a UE control channel. Symbols from a second symbol to a thirteenth symbol of the subframe may be used for DL data transmission or UL data transmission. As described above, when DL transmission and UL transmission are sequentially performed in one subframe, the UE may receive DL data and transmit UL hybrid automatic repeat request (HARQ)-acknowledgement (ACK) in one subframe. Finally, a time taken for retransmission upon generation of data transmission error may be reduced. Accordingly, transfer delay of final data may be minimized. In such a subframe structure, a base station and the UE may need a gap to convert a transmission mode into a reception mode or from the reception mode into the transmission mode. To this end, a partial symbol of a time point converted from DL to UL in the subframe structure may be configured as a guard period (GP).

A physical channel in the NR is described.

An antenna port is defined so that a channel on which a symbol is transported on the antenna port may be inferred from a channel on which a different symbol is transported on the same antenna port. If a large-scale characteristic of a channel to which a symbol is transferred on one antenna port may be inferred from a channel to which the symbols is transferred on a different antenna port, two antenna ports may have quasi co-located (QCL) relation to each other. The large-scale characteristic includes at least one of delay spread, Doppler diffusion, Doppler shift, average gain, average delay, and space reception parameter.

With respect to each numerology and carrier, a resource grid consisting of a plurality of subcarriers and a plurality of OFDM symbols is defined. The resource grid starts from a specific common resource block indicated by higher layer signaling. There is one resource grid per antenna port, per numerology, and per transmission direction (DL or UL). Per antenna port and per numerology, each element in the resource grid is called resource element (RE).

The resource block (RB) is defined as 12 continuous subcarriers at a frequency domain. A reference RB starts from 0 at a frequency domain to be indexed in a gradually increased direction. A subframe 0 of the reference RB is common in all numerologies. A subcarrier of an index 0 of the reference RB functions as a common reference point with respect to another RB grid. A common RB starts from 0 at a frequency domain with respect to each numerology to be indexed in a gradually increased direction. A subcarrier having an index 0 of a common RB having index 0 corresponds to a subcarrier having index 0 of the reference RB in each numerology. A physical RB (PRB) and a virtual RB are defined in a bandwidth part (BWP), and starts from 0 in the BWP to be indexed in a gradually increased direction.

The BWP is defined as a continuous group of a selected PRB in a continuous group of common RBs in a given carrier and a given numerology. The UE may be configured with maximum 4 BWPs in DL, and only one DL BWP may be activated at a given time point. It is expected that the UE does not receive a physical downlink shared channel (PDSCH), a physical downlink control channel (PDCCH), a channel state information reference signal (CSI-RS) or a tracking RS (TRS) at an outside of an activated BWP. Further, the UE may be configured with maximum 4 BWPs in UL, and only one UL BWP may be activated at a given time point. When the UE is configured with a supplemental UL (SUL), the UE may be configured with maximum 4 BWPs in SUL, and only one UL BWP may be activated at a given time point. The UE cannot transmit a physical uplink shared channel (PUSCH) or a physical uplink control channel (PUCCH) at an outside of an activated BWP.

In a DL transmission scheme at the NR, a closed loop demodulation RS (DM-RS) based spatial multiplexing is supported for a PDSCH. Maximum 8 and 12 orthogonal DL DM-RS ports support type 1 and type 2 DM-RSs, respectively. Maximum 8 orthogonal DL DM-RS ports are supported per UE with respect to single-user multiple-input multiple-output (SU-MIMO). Maximum 4 DL DM-RS ports per UE are supported with respect to multi-user MIMO (MU-MIMO). The number of SU-MIMO code-words is 1 with respect to 1-4 layer transmission and 2 with respect to 5-8 layer transmission.

The DM-RS and a corresponding PDSCH are transmitted using the same pre-coding matrix, and the UE does not need to know a pre-coding matrix in order to demodulate transmission. A transmitter may use different pre-coder matrixes with respect to different parts of a transmission bandwidth that results in a frequency selective pre-coding. Further, the UE may assume that the same pre-coding matrix is used through a group of PRBs called pre-coding RB group.

DL physical layer processing of a transmission channel is configured by following steps:
  Transmission block cyclic redundancy check (CRC) attach;
  Code block division and code block CRC attachment;
  Channel coding: low-density parity-check (LDPC) coding;
  Physical layer hybrid HARQ processing and rate matching;
  Bit interleaving;
  Modulation: quadrature phase shift keying (QPSK), 16 quadrature amplitude modulation (QAM), 64-QAM and 256-QAM;
  Layer mapping and pre-coding;
  Mapping to an assigned resource and an antenna port.

The UE may assume that at least one symbol having a DM-RS is included in each layer in which a PDSCH is transmitted to the UE. The number of DM-RS symbols and resource element mapping are configured by a higher layer. A TRS may be transmitted on an additional symbol in order to assist receiver phase track.

The PDCCH is used to schedule DL transmission on the PDSCH and UL transmission on the PUSCH. Downlink control information (DCI) on the PDCCH include following information.

DL assignment including at least modulation and coding scheme, resource assignment and HARQ information associated with DL shared channel (DL-SCH);

UL scheduling grant including at least modulation and coding scheme, resource assignment and HARQ information associated with UL shared channel (UL-SCH).

A control channel is formed by a group of control channel elements, and each control channel element consists of a set of resource element groups. Different numbers of control channel elements are collected so that different code rates with respect to the control channel are configured. Polar coding is used for the PDCCH. Each resource element group transporting the PDCCH transports a DM-RS thereof. QPSK modulation is used for the PDCCH.

Figure 3:
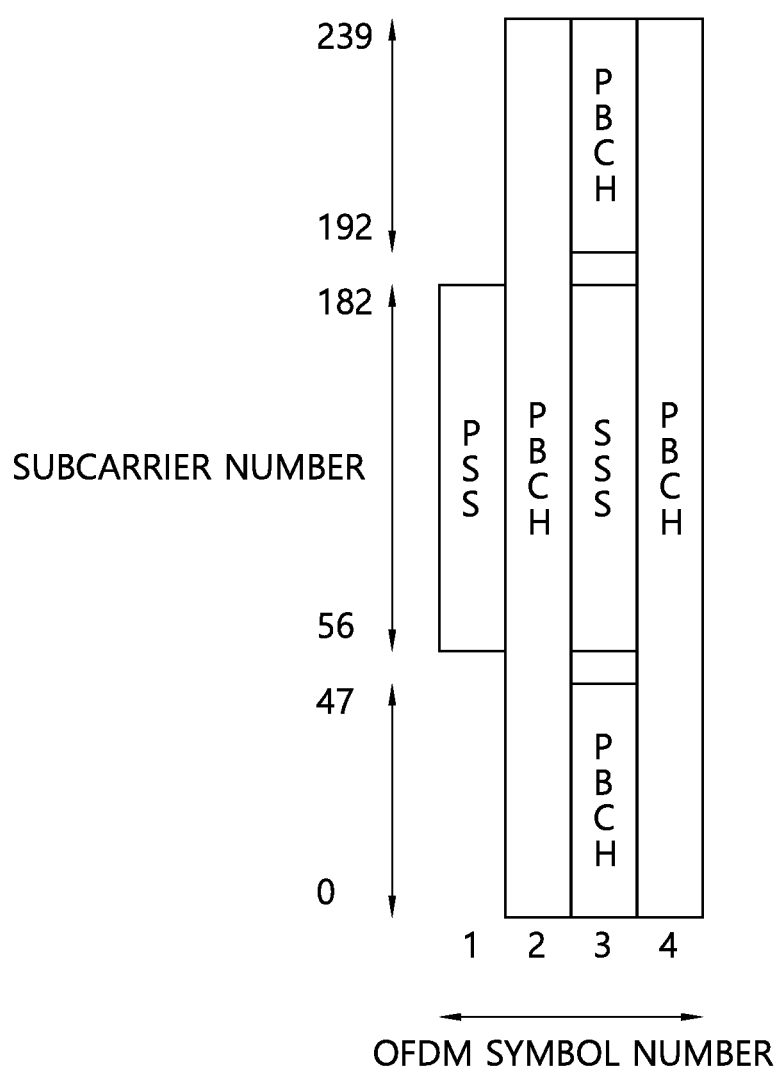
FIG. 3 shows a time-frequency structure of an SS block.

FIG. 3 shows a time-frequency structure of an SS block. A synchronization signal and a physical broadcast channel (PBCH) block (hereinafter referred to as, 'SS block') consists of a primary synchronization signal (PSS) and a secondary synchronization signal (SSS), occupying 1 symbol and 127 subcarriers respectively, and a PBCH, which is configured by three symbols and 240 subcarriers but which leaves a unused part at a middle on one symbol for the SSS. A transmission period of the SS block may be determined by a network, and a time position to which the SS block is transmitted is determined by a subcarrier spacing.

Polar coding is used at the PBCH. Unless the network configures different subcarrier spacings to the UE, the UE may assume a band specific subcarrier spacing for the SS block. A PBCH symbol transports frequency multiplexed DM-RS thereof. QPSK modulation is used for the PBCH.

When supported by the network, a wideband may be used in NR. Further, in the NR, a bandwidth supported from the network may differ from a bandwidth supported from the UE. In this case, there is a need to clearly define how to performing transmission and/or reception between the network and the UE.

Figure 4:
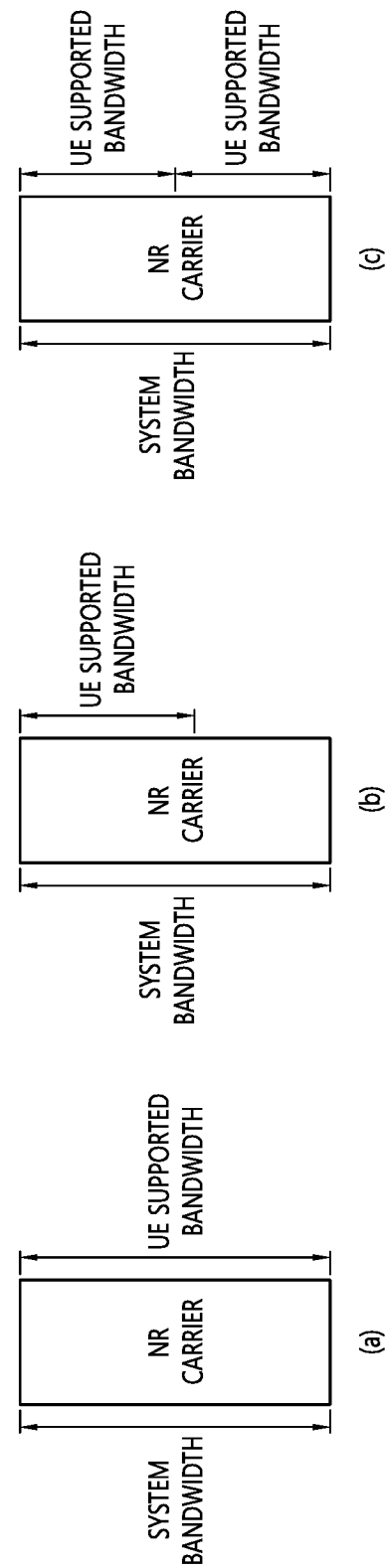
FIG. 4 shows an example of a system bandwidth and a bandwidth supported from the UE in an NR carrier.

FIG. 4 shows an example of a system bandwidth and a bandwidth supported from the UE in an NR carrier. It is assumed in FIG. 4 that a bandwidth supported from a network is a system bandwidth. However, according to a required system bandwidth, the network may combine an NR carrier. Further, the bandwidth supported from the UE may correspond to the BWP mentioned above. FIG. 4-(a) illustrates a case where the system bandwidth is the same as the bandwidth supported from the UE. FIG. 4-(b) illustrates a case where the system bandwidth differs from the bandwidth supported from the UE. In FIG. 4-(b), the bandwidth supported from the UE may be less than the system bandwidth or the bandwidth supported from the UE may be greater than the system bandwidth. FIG. 4-(c) illustrates a case where the UE support a wideband using a plurality of radio frequency (RF) elements. Accordingly, the system bandwidth may be the same as the bandwidth supported from the UE. A plurality of RF elements may share a baseband element. An individual baseband element may be assigned in a unit of each RF element. It is assumed in the present disclosure that a plurality of RF elements may share a baseband element/ability. The above may depend on UE ability.

Figure 5:
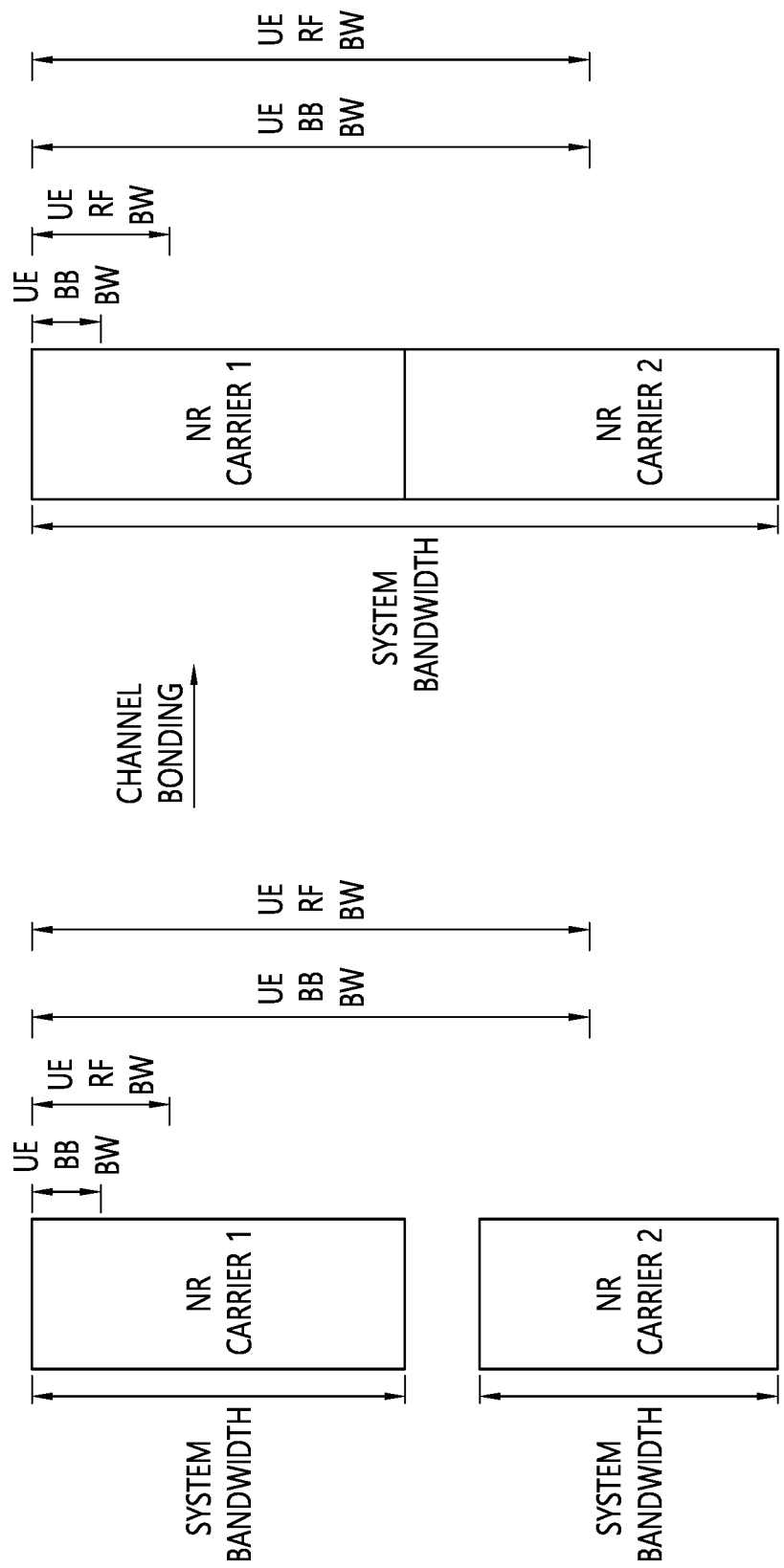
FIG. 5 shows an example of carrier aggregation.

FIG. 5 shows an example of carrier aggregation. If a plurality of NR carrier is aggregated to configure one carrier, the system bandwidth may be changed and a center frequency may be changed. However, a direct current (DC) subcarrier may be changed or may not be changed according to an operation of the network. When the DC subcarrier is changed, the DC subcarrier may be indicated to the UE to suitably process the DC subcarrier.

A UE-specific system bandwidth may be allocated to a UE. The following may be considered to allocate a UE-specific system bandwidth.

(1) A carrier can be divided into a set of minimum subbands (M-SB). The set of M-SB may be configured for a UE by UE-specific signaling.

(2) The first frequency location and the last frequency location of a UE-specific system bandwidth may be configured for the UE by the UE-specific signaling.

(3) The carrier may be divided into a set of PRBs. The set of PRBs may be configured for the UE by the UE-specific signaling.

The carrier may be divided into a set of PRB groups. The set of PRB groups may be configured for the UE by UE-specific signaling. A PRB group may be comprised of M PRBs that are allowed to be positioned contiguously. A size of the M PRBs may be selected to be identical to a size of one PRB based on a greatest subcarrier spacing supported by the carrier. A set of PRB groups may be the same concept as the aforementioned BWP.

When a set of M-SBs, a set of PRBs, or a set of PRB groups is used for a UE-specific bandwidth, the set of M-SBs, the set of PRBs, or the set of PRB groups may be configured based on a reference numerology or a default numerology. The reference numerology or the default numerology may be a numerology used for an SS block, may be predetermined, or may be explicitly or implicitly configured through system information block (SIB), master information block (MIB), or the like.

When carrier aggregation is applied, a system bandwidth may be updated through SIB/MIB or the like. As described above, a center frequency or a DC subcarrier may be also updated through SIB, MIB or the like For convenience of explanation, it is presumed that a carrier is comprised of M PRBs. The M PRBs may be based on a reference numerology or a default numerology.

In NR, a UE may be required to change its own bandwidth in various scenarios. At this point, a UE-specific configured bandwidth may be the aforementioned BWP. A BWP may be configured for each RE If the UE has a plurality of RFs, the UE may be configured with a plurality of BWP respectively for the plurality of RFs.

In order to deal with a situation in which a BWP, which is a UE-specific bandwidth, changes dynamically, it is necessary to clearly define various aspects, for example, the center frequency (in each of transmitter and receiver aspects), resource allocation, data scrambling, DCI design, etc. In addition, it is also necessary to clearly define how to process common control signal/data, UE-specific control signal/data, group common control signal/data (e.g., multicast control signal/data), and the like.

Hereinafter, various aspects of the present disclosure will be described.

1. Same/Cross Slot Scheduling and Multi-Slot Scheduling (1) In DL, for switching between same/cross slot scheduling and multi-slot scheduling, the following matters can be considered.

First, by a semi-static configuration, at least one of the same/cross slot scheduling and the multi-slot scheduling may be selected, and the switching between the same/cross slot scheduling and the multi-slot scheduling may be dynamically indicated. For example, the same/cross slot scheduling without the multi-slot scheduling may be selected by the semi-static configuration, and a first starting slot may be dynamically indicated. As another example, the same/cross slot scheduling and the multi-slot scheduling may be configured, and without an indication for a starting slot index, only a duration in the slot may be indicated. A set of parameters included in DCI may be indicated to be supported by a UE or may be configured according to a configured type. Meanwhile, either one of the same/cross slot scheduling, or the multi-slot scheduling may be selected, and in this case, a dynamic switching between the same/cross slot scheduling and the multi-slot scheduling may not be required.

All available options may be dynamically selected. In this case, the starting slot index and/or a period in the slot may be dynamically indicated.

(2) In UL, a mechanism similar to DL is applicable.

In the case that both of a slot based scheduling and a mini-slot based scheduling are configurable in a UE, operations that the UE may take for distinguishing the slot based scheduling and the mini-slot based scheduling is as below.

(1) Based on a search space configuration and/or control resource set (CORESET) configuration, the UE may know whether it is the slot based scheduling or the mini-slot based scheduling. For example, the UE may be indicated with whether it is the slot based scheduling or the mini-slot based scheduling through the search space configuration and/or the CORESET configuration. It is available for the UE to configure both the slot based scheduling and the mini-slot based scheduling, and in this case, the UE may be indicated with a slot granularity or a mini-slot granularity through scheduling DCI.

(2) Based on a DCI format and/or the size thereof, the UE may know whether it is the slot based scheduling or the mini-slot based scheduling. The slot based scheduling and the mini-slot based scheduling may use different DCI formats/sizes. According to the DCI format and/or the size thereof, the UE may know whether it is the slot based scheduling or the mini-slot based scheduling. In addition, as described above, it is available for the UE to configure both the slot based scheduling and the mini-slot based scheduling. Accordingly, there may be DCI format/size that includes both the slot based scheduling related DCI field and the mini-slot based scheduling related DCI field.

When the slot based scheduling is considered, a timing between control signal and data, a timing between data and uplink control information (UCI), a parameter related to CSI-RS feedback, a parameter related to sounding reference signal (SRS), and the like may be configured based on a slot unit. The indicated value may be interpreted based on a slot of a given numerology. The numerology may be defined by a valid carrier or a scheduled carrier in which an actual operation may occur.

When the mini-slot based scheduling is considered, a timing between a control signal and a data, a timing between data and UCI, a parameter related to CSI-RS feedback, a parameter related to SRS, and the like may be configured based on a symbol unit, a symbol group unit or a mini-slot unit. A configuration of a way of index/gap mapping may be configured by a higher layer. For example, the number of symbols used for the mini-slot based scheduling may be indicated.

In summary, according to various scheduling units, a set of sizes and timings of a supported scheduling unit may be semi-statically configured. According to sizes and timings of a supported scheduling unit, a field in dynamic scheduling (i.e., DCI) may be defined, and sizes and timings of actual scheduling unit may be dynamically indicated. In addition, the slot based scheduling and the mini-slot based scheduling may be distinguished by DCI format and/or CORESET configuration.

Meanwhile, a slot unit and a mini-slot unit may be differently used in DL and UL, respectively. More particularly, according to a channel relation such as a timing between a control signal and data, a timing between data and UCI, and the like, timings in DL and UL may be different with each other.

In relation to time domain resource allocation, the following matters may be considered.

(1) In K slots starting from slot n in which a control signal is transmitted, a resource allocation which is similar to resource allocation type 2 in LTE may be considered. That is, dense/consecutive resource allocation may be considered. When the slot based scheduling and the mini-slot based scheduling are supported simultaneously, instead of K slots, a plurality of symbols in K slots may be used for a resource allocation.

(2) A bitmap may be indicated for a resource allocation. Each bit may indicate a slot format type, rather than on/off of the resource allocation. The UE may consider that data may be mapped to a DL part (i.e., DL BWP) and a UL part (i.e., UL BWP) for the respective DL transmission and UL transmission.

(3) The DCI format may be configured based on the single slot scheduling. For the multi-slot scheduling, the UE may be configured with information for maximum number and scheduling type of scheduling. In the multi-slot scheduling, the scheduling information for the first slot may be repeatedly used in later slots. Alternatively, individual scheduling information may be provided for each slot.

A mechanism similar to that of described above may also be supported in the mini-slot based scheduling. To simplify the design, the multi mini-slot based scheduling may not be supported in the mini-slot based scheduling. Instead, sizes and scheduling intervals of available data mapping period may be separately configured.

In summary, for the slot based scheduling and the mini-slot based scheduling, a time domain resource may be individually indicated. Starting/last slot/mini-slot index may be indicated through the mechanism similar to the resource allocation type 2 of LTE. To determine a size of a resource allocation field, K slots (or maximum period) may be configured by a higher layer signaling.

In relation to a transport block size (TBS) mapping according to the multi-slot scheduling, the following matters may be considered. First, when a TB is mapped across a multi-slot, data may be omitted during the multi-slot due to ultra-reliable and low latency communication (URLLC) and/or a slot type change. Accordingly, there are considerations in calculating an effective RE. More particularly, the UE may determine the TBS using usable REs at a control signal reception timing. However, when a rate matching that may increase a coding rate during the multi-slot occurs, the UE does not change the usable RE and the modulation and coding scheme (MCS). A dynamic indication for the rate matching may include information for different slot types based on a group-common PDCCH and/or information for a dynamic rate matching pattern (e.g., for CSI-RS and SRS) by the group-common PDCCH. Meanwhile, in processing the group-common PDCCH transmitted simultaneously with the dynamic scheduling or in the same slot, a TBS may be determined without considering the group-common PDCCH. That is, a TBS may be determined based on information from scheduling DCI only. Alternatively, a TBS may be determined based on the dynamic scheduling DCI transmitted from the same slot or the same mini-slot and the information from the group-common PDCCH.

A TBS in DL may be determined by any one of the followings.

(1) Reference number of usable REs for each slot: Regardless of a starting/last symbol or a reserved resource in each slot, a reference number of usable REs for each slot may be defined. For example, the reference number of usable REs for each slot may be defined based on one of the following assumptions.

- A maximum number of usable symbols for CORESET may be used for a control region, and in the corresponding control region, the data and the control signal may not be multiplexed.
- A slot length may be 14 symbols or 7 symbols according to a configuration.
- A DM-RS pattern based on a reference DM-RS pattern or a DM-RS pattern semi-statically configured may be used.
- A reserved resource may not be present in the data region.
- A control signal of another UE may not be present in the data region.
- A symbol of the number which is semi-statically configured may be used for guard period (GP) and uplink pilot time slot (UpPTS) (i.e., the corresponding symbol is not used for DL).

In addition, in the mini-slot based scheduling, a reference number of symbols used in the mini-slot based scheduling may also be configured.

(2) Number of scheduled slots
(3) MCS
(4) Scheduling factor which is dynamically indicated A TBS in UL may be determined by any one of the followings.

(1) Reference number of usable REs for each slot: Regardless of a starting/last symbol or a reserved resource in each slot, a reference number of usable REs for each slot may be defined. For example, the reference number of usable REs for each slot may be defined based on one of the following assumptions.

- A maximum number of usable symbols for UCI and/or SRS may be used for a control region, and in the corresponding control region, the data and the control signal may not be multiplexed. The maximum number of usable symbols for UCI and/or SRS may be the same as DL control region which is defined by a system bandwidth. The maximum number of usable symbols for DL and/or UL may be indicated by 0 or 1. At this time, 0 may indicate 2 symbols, and 1 may indicate 3 symbols. That is, instead of indicating the system bandwidth, 0 or 1 may be indicated. Alternately, a resource of the worst situation used for the control region may be indicated, and accordingly, the UE may exclude the corresponding resource in a potential data mapping.
- A slot length may be 14 symbols or 7 symbols according to a configuration.
- A DM-RS pattern based on a reference DM-RS pattern or a DM-RS pattern semi-statically configured may be used.
- A reserved resource may not be present in the data region.
- A control signal of another UE may not be present in the data region.
- A symbol of the number which is semi-statically configured may be used for GP and downlink pilot time slot (DwPTS) (i.e., the corresponding symbol is not used for UL).

In addition, in the mini-slot based scheduling, a reference number of symbols used in the mini-slot based scheduling may also be configured.

(2) Number of scheduled slots
(3) MCS

In another slot, not the slot in which a control signal is transmitted, a size of the control region may be zero. That is, the control signal may not be transmitted in the corresponding slot. Different number of symbols per slot may be semi-statically configured for a reference number of usable REs.

When a semi-static DL/UL configuration is used without flexible resource use, the UE may know fixed DL/UL part in each slot, and accordingly, the number of actual symbols in each slot may be used, rather than a fixed number of DwPTS/UpPTS in each slot.

In summary, in calculating a TBS, a reference number of REs may be determined based on a reference number of symbols in each slot, and this may exclude a region which is unusable for PDSCH/PUSCH. The reference number of symbols in each slot may exclude a part which is varied depending on time such as a reserved resource, unless the reference number is defined otherwise according to a slot.

2. Rate Matching

The rate matching is referred to an operation, to guarantee a specific transmission, of matching a code rate of another transmission in periphery of a resource in which the corresponding specific transmission is transmitted.

With respect to a data scheduling, the following resource allocation may be considered.

(1) PDSCH/PUSCH may be scheduled in a slot, and a control channel may be monitored maximum once per slot.

When scheduled in a slot, a resource allocation is required for the same slot scheduling and the cross-slot scheduling. In the case that the cross-slot scheduling is dynamically indicated, it may be represented whether the corresponding scheduling is the same slot scheduling or the cross-slot scheduling based on starting PDSCH/PUSCH slot index.

When a dynamic rate matching pattern and the indication therefor are provided, an actual rate matching may be performed in the scheduled slot. In the case of UL transmission, when the dynamic rate matching pattern is indicated by a group-common PDCCH, the UE may not acquire the group-common PDCCH, and accordingly, a puncturing may be performed instead of the rate matching on the indicated rate matching pattern. In addition, even in the case that the UE acquires the rate matching pattern, the UE may not perform the rate matching according to the UE processing capability. Accordingly, in this case, a puncturing may be performed, or the dynamic rate matching pattern may be transmitted through UE-specific DCI only. That is, the dynamic rate matching pattern indicated by the group-common PDCCH may be applied to DL data transmission only, or when the group-common PDCCH indicates an unusable resource for PDSCH or PUSCH, a puncturing may be performed instead of the rate matching.

A plurality of rate matching patterns may be configured by a higher layer, and an actual rate matching pattern may be indicated by a dynamic signaling. At least two rate matching sets may be considered. First, as a rate matching pattern in a single slot, this may include a set of zero-power (ZP) CSI-RS and/or SRS. Second, as a rate matching pattern in a multi-slot, this may include a period and an offset of ZP-CSI-RS and/or SRS. In other words, the configuration related to a plurality of rate matching patterns may be configured together with a period and an offset, and each rate matching pattern may be configured with a set of such a configuration. For example, the ZP-CSI RS of period x ms may be configured to ZP-CSI-RS pattern 1, the ZP-CSI RS of period z ms may be configured to ZP-CSI-RS pattern 3 and the SRS of period y ms may be configured to SRS pattern 2. And, a set of each pattern may include 1) ZP-CSI-RS pattern 1 and SRS pattern 2 and 2) ZP-CSI-RS pattern 3. When 1) is indicated, the UE may perform the rate matching in periphery of pattern 1/2 for each of DL/UL, and when 2) is indicated, the UE may perform the rate matching in periphery of pattern 3.

More generally, a set of rate matching patterns and/or an RS pattern may be configured, and one or more of the corresponding patterns may be dynamically selected for the rate matching. A part of the RS pattern may indicate the entire symbols to process the case of different numerologies between data and RS transmission. Accordingly, instead of the RS pattern configuration, a pattern including a set of symbols for the rate matching may be configured as a valid rate matching pattern, and this may include a period and an offset. Further to the period and the offset, a bandwidth of the rate matching may also be configured.

(2) PDSCH/PDSCH may be scheduled in a plurality of slots, and the control channel may be monitored maximum once per slot. To avoid the control region, one of the rate matching patterns may include a control region configuration. Accordingly, a data rate matching may be considered in periphery of the control region. That is, when a plurality of slots is scheduled, it may be indicated dynamically or semi-statically whether to perform the rate matching in periphery of the control region.

(3) PDSCH/PDSCH may be scheduled in a mini-slot, and the control channel may be monitored once or more times per slot.

(4) PDSCH/PDSCH may be scheduled in a mini-slot, and the control channel may be monitored maximum once per slot.

(5) PDSCH/PDSCH may be scheduled in a slot, and the control channel may be monitored once or more times per slot.

(6) PDSCH/PDSCH may be scheduled in a plurality of slots, and the control channel may be monitored once or more times per slot.

The rate matching may be considered in the following cases.

Control resource used by another UE
ZP-CSI-RS or CSI-RS
DM-RS (in the case of interleaved FDMA (IFDMA)
Reserved resource (cell-specific RS (CRS) of LTE or PDCCH of LTE or another reserved resource for future compatibility)
Control signal/data transmitted through common search space (CSS)
Its own control signal scheduling
Tracking RS (TRS)
Beam management CSI-RS (may be included in ZP-CSI-RS)

Since different beams may be used between the data and the RS described above, the rate matching in periphery of the RS may be either one of the rate matching in periphery of REs used for the RS or the rate matching in periphery of the symbol used for the RS. Depending on the rate matching pattern, an actual rate matching pattern may be either one of a set of RS configurations or a set of symbols.

When the rate matching pattern corresponds to a set of RS configurations, a set of the rate matching patterns may be configured as below.

(1) Independent configuration of zero-power RS for each RS type (e.g., ZP-CSI-RS, ZP-DM-RS, ZP tracking RS, ZP beam management RS): Regardless of whether the UE performs an actual function based on the configured RS, the UE may be required to perform the rate matching in periphery of the configured RS.

(2) Integrated rate matching pattern that may include one or more RS types

When a set of symbols is used for the rate matching, the rate matching pattern may be configured with a PRB or a set of RBGs and a plurality of symbols (i.e., starting and last symbols).

In addition, in the case that the UE is configured to perform the rate matching in RE level, the rate matching pattern of RE level may also be configured.

With respect to the rate matching pattern for a DM-RS symbol, in the case that CSI-RS or DM-RS of another UE is multiplexed with DM-RS of a single UE in a certain symbol, the rate matching pattern may be the entire corresponding symbols, or the RS used for the corresponding DM-RS. Alternatively, the rate matching pattern may be differently configured from the DM-RS pattern indicated for the corresponding UE.

Hereinafter, the rate matching for PDSCH based on the mini-slot scheduling is described. Regardless of a position of an actual mini-slot, the rate matching pattern and the indication therefor may follow the rate matching pattern in the slot based scheduling and the indication therefor. The rate matching may be applied by overlapping PDSCH and rate matching pattern indication. Accordingly, there is an advantage that the UE may always apply the same rate matching mechanism regardless of the slot based scheduling or the mini-slot based scheduling. On the other hand, there is a disadvantage that a flexibility of the rate matching pattern is degraded. Such a mechanism may be proper when the mini-slot based scheduling is used in an unlicensed spectrum or millimeter wave.

In the unlicensed spectrum, the rate matching pattern may be applied according to at least one of the following mechanisms.

The rate matching pattern may be applied by assuming that the first symbol in which a control signal/a data starts is the first symbol of a slot after a channel sensing. In other words, in the case that the rate matching pattern indicates that the first symbol in the slot is rate-matched, the symbol in which an actual rate matching is performed may be changed according to a channel sensing result. The first symbol in which the control signal/data starts may be implicitly indicated according to a blind detection or explicitly indicated according to a group-common signaling. This means that the configured RS may be flexibly transmitted by the starting symbol.

The rate matching pattern may be applied regardless of the first symbol of a transmission. In other words, the rate matching pattern may be applied by assuming that a slot boundary is not changed. This means that the configured RS may be transmitted based on a fixed slot boundary.

The rate matching pattern may be applied by assuming that the first symbol of a transmission is the $K^{th}$ symbol. K may be configured by a higher layer.

Different rate matching patterns may be applied in different manner. For example, the rate matching for CSI-RS may be applied based on a fixed slot boundary, and the rate matching for DM-RS may be flexibly applied.

In addition, a set of the rate matching patterns may be configured for each symbol or for each mini-slot.

Hereinafter, the rate matching of a control channel is described.

In the slot based scheduling, in the case that a starting symbol of a control channel is not the first symbol, and a period of the control channel is longer than one symbol, or a starting symbol of the control channel is the same symbol as the symbol in which DM-RS is transmitted, a method for processing the DM-RS is required. Regardless of whether it is the slot base scheduling, or the mini-slot based scheduling, a control region needs to be finished earlier than the symbol in which the DM-RS is transmitted, such a case may be allowed. Even in the case that the UE is configured more longer period, the UE may assume that an actual last symbol of the control channel is earlier than the DM-RS symbol. In this case, the following matters may be considered.

The DM-RS may be rate-matched for mapping of the control channel in a DM-RS symbol. The rate matching pattern for the DM-RS is required to be indicated. In such a case, since the number of valid REs per control channel element (CCE) decreases, a set of different aggregation levels (ALs) may be used for handling a small number of valid UEs.

The DM-RS symbol may be rate-matched for mapping of the control channel in a DM-RS symbol. In this case, an REG is not mapped to the DM-RS symbol. Therefore, actual REG-CCE mapping may be discontinuous in a time domain. For example, a period of the control channel may be configured as 3 symbols, and one of them may be rate-matched owing to the DM-RS. In such a case, an actual period of the control channel becomes 2 symbols, and the REG-CCE mapping may be performed by assuming that the control channel is 2 symbols. A REG bundling size in a frequency domain may be 1 or 3.

Similarly, with respect to a mini-slot based control signal/data scheduling, the rate matching may be performed in periphery of DM-RS RE or DM-RS symbol.

It is described rate matching for another resource (e.g., DM-RS symbol) which is rate-matched for a group-common or other potential CSS or CORESET. In the case that the group-common PDCCH is transmitted, and the UE anticipates the rate matching on the group-common PDCCH or the CSS REG, the following matters may be considered for the REG-CCE mapping.

(1) The REG-CCE mapping may not be influenced by the rate matching. The REG-CCE mapping may be performed as if the group-common PDCCH or the CSS REG is not present. In the CCE-PDCCH mapping, the CCE having K rate-matched REGs may be omitted. In other words, the corresponding CCE may not be considered as a PDCCH candidate. At this time, K may be configured by a higher layer and have one value among 1 to 6. Alternatively, in the CCE-PDCCH mapping, the CCE having rate-matched REGs may be considered for PDCCH mapping. Meanwhile, a PDCCH candidate that does not have a usable REs for the control channel mapping (e.g., AL=1) may be existed. Such a PDCCH candidate may be omitted in monitoring. Alternatively, a PDCCH candidate of which a ratio of valid REs is M % or less may be omitted in monitoring. For example, in the case that a ratio of valid REs after the rate matching is M % or less before the rate matching, the corresponding PDCCH candidate may be omitted in monitoring. K may be configured by a higher layer and have one value among 0 to 100.

(2) The REG-CCE mapping may be performed by being rate-matched in periphery of a group-common PDCCH or a REG for CSS or REG bundle. The REG bundle may include one or more REGs. In such a case, in the case that a search space for the corresponding PDCCH and a search space for the group-common PDCCH and/or CSS use different number of symbols, a time-first mapping may not be easy. Therefore, the mechanism may be used only for the case that the REG-CCE mapping is frequency-first. In the case that the time-first mapping is used, in the PRB to which at least one symbol is rate-matched, any REG may not be mapped. Alternatively, in the case that the time-first mapping is used, the entire symbols may be rate-matched. Similar to a processing of the DM-RS, any REG may not be mapped to the rate-matched symbol. Accordingly, an effective period for CORESET may become smaller than the configured period.

With respect to different UE-specific RS like a CSI-RS or a phase tracking (PT)-RS, in the case that the control channel is transmitted to data region of another UE, the corresponding control channel may be mapped to a region to which the RS is transmitted. In order to process such a case, the following matters may be considered.

(1) The control channel may not be mapped to a symbol in which an RS is transmitted, or the control channel may not be mapped to a frequency domain and symbol to which the RS is mapped. Particularly, it is required to avoid the RS of another UE. With respect to a UE-specific RS, the control signal and data between different UEs may be multiplexed in frequency division multiplexing (FDM) manner. With respect to the CSI-RS, the rate matching pattern of the CSI-RS may be used, and the control signal may be mapped to a periphery of the CSI-RS. The rate matching pattern of the CSI-RS may be indicated for each symbol or for each slot with a period.

(2) The RS may be rate-matched in a periphery of a potential control region, and the rate matching pattern may be dynamically indicated for data scheduling.

(3) For the same UE, a control channel may be rate-matched in a periphery of an RS. In addition, unless the UE is configured with the rate matching pattern for the RS or zero-power RS, the UE may assume that an RS transmission for another UE is not present. For its own RS, the control signal transmitted in the data region may be rate-matched in a periphery of the RS.

Meanwhile, when the group-common PDCCH is transmitted in the data region, the group-common PDCCH may collide with RSs from a plurality of UEs. The mechanism described above may be used for the group-common PDCCH. In the case that a known cell-common or group-common RS is present in the UE, the rate matching for the corresponding RS is also available.

A processing of the group-common PDCCH in remaining system information (RMSI) CORESET or different CSS CORESET is described. In the case that the group-common PDCCH is separately configured or configured as a subset of CSS, the group-common PDCCH may be configured with a part of the RMSI CORESET which is already read before being configured with the group-common PDCCH or different CSS CORESET. In order to process such a case, the following matters may be considered.

(1) The group-common PDCCH may always be present regardless of a configuration. The UE is not required to read the group-common PDCCH until the UE is configured to read it. However, a resource for the group-common PDCCH may be reserved in all CSS CORESETs. A disadvantage of such a method is that overhead for the group-common PDCCH occurs regardless of whether the group-common PDCCH is actually transmitted. In addition, in the case that the group-common PDCCH is periodically transmitted, information needs to be used even in a slot in which the group-common PDCCH is not configured.

(2) The group-common PDCCH may not be existed in the CSS that the UE read before radio resource control (RRC) connection. For example, the CSS used for the RMSI CORESET and/or random access response (RAR)/Msg 4/RRC configuration may not carry the group-common PDCCH. For this, in the last CCE of CORESET, the resource for the group-common PDCCH may be reserved. Accordingly, the number of candidates for the RMSI and an initial CSS CORESET is limited, and the UE may operate transparently from the group-common PDCCH in an initial access procedure.

(3) A network may omit a transmission of the group-common PDCCH in the RMSI or the CORESET in which the initial access related PDSCH is scheduled. A set of CORESET for the initial access procedure may be indicated to the UE, and the UE may anticipate that the group-common PDCCH is not transmitted in the corresponding resource. For example, the RMSI or the CORESET used for the CSS for the initial access may not be used for a transmission of the group-common PDCCH. In this case, the UE may be configured with separate CORESET for the group-common PDCCH or configured with different CSS including the group-common PDCCH.

Meanwhile, due to different use example or usability, a configuration between different operations may also be considered.

In configuring the rate matching, the following matters may be considered for processing BWP.

(1) A set of common rate matching patterns may be applied to any configured BWP including a transmission of a common channel and any PDCCH. In this case, the rate matching pattern may be configured based on a reference numerology. The reference numerology may be defined as a numerology used for transmitting SS block or the RMSI. Alternatively, the reference numerology may be configured by a higher layer. Alternatively, the reference numerology may be defined as a numerology that corresponds to sub-carrier spacing 15 kHz.

(2) A set of separate common rate matching patterns may be configured for each BWP. In this case, for the common data scheduling, separate set of rate matching patterns may be required to be configured. In addition, the rate matching pattern may be configured based on the numerology used in each BWP.

(3) A set of separate common rate matching patterns may be configured for each CORESET. For example, in the case that the CORESET is shared between two BWPs that use the same numerology and the smaller BWP between them is a subset of the greater BWP, it may be preferable to configure a set of the common rate matching patterns based on the greater BWP.

(4) In the case that the cross-slot scheduling and the cross BWP scheduling are considered, the rate matching pattern indicated in DCI may be based on the rate matching pattern configured for data BWP. That is, the rate matching pattern may be applied in a scheduled BWP.

In processing common data, the rate matching pattern may be indicated by RMSI or on-demand SI (OSI). For example, for RMSI PDSCH transmission, different RS such as SS block or beam management RS may need to be rate-matched. For the CSI-RS, ZP-CSI-RS may be configured, and one of them may be dynamically indicated, or a set of symbols may be configured for the rate matching. Alternatively, the common data may be processed by explicitly indicating starting and end symbols, and during the period, the rate matching may not be applied.

The rate matching in the multi-slot scheduling may be considered as one of the followings.

(1) The rate matching pattern for each slot may be repeated for each indicated slot.

The rate matching pattern may be indicated by a slot only.

(2) The rate matching pattern may be dynamically indicated for each slot.

(3) The rate matching may be performed only in the first slot (and/or last slot).

The rate matching pattern (or rate matching resource) that may be dynamically indicated may be configured by 1 bit or 2 bits. Alternatively, the rate matching pattern may be configured by 3 bits. In the case of the cross-slot scheduling, the multi-slot scheduling and non-slot scheduling, a timing when the rate matching pattern is used needs to be clearly defined. At this time, the following matters may be considered.

Same slot or single slot PDSCH: The rate matching pattern of 1 bit or 2 bits may be applied to a scheduled slot.

Same slot and non-slot PDSCH: The rate matching may be performed in a symbol in which the non-slot PDSCH and the rate matching pattern are overlapped. The multi-non-slot by dynamic scheduling may not go beyond a slot boundary. In the case of going beyond a slot boundary, the same method as the case of multi-slot may be used.

Cross-slot and single-slot PDSCH: The rate matching may be performed in a scheduled slot.

Multi-slot PDSCH: In the case that the rate matching pattern of 2 bits is configured for a single slot, the same rate matching pattern may be applied to each slot to which the multi-slot PDSCH is mapped. In the case that there is a UL slot configured semi-statically during the multi-slot PDSCH period, similar to the PUCCH, the multi-slot PDSCH may be delayed in the corresponding UL slot. When the rate matching pattern of 2 bits is configured for two slots, the rate matching pattern of 2 bits may be applied to each of even ordered/odd ordered slots regardless of a place in which the first transmission occurs. Alternatively, in the case that the rate matching pattern of 28 bits for two slots (e.g., bitmap configuration of 14 symbols for each of two slots), the rate matching pattern of 28 bits may be applied to each of even ordered/odd ordered slots in which an actual transmission is performed. As described above, in the case that a delay occurs by the UL slot which is configured semi-statically, a transmission may occur discontinuously, and accordingly, it may be simpler method to apply the rate matching pattern of 28 bits applied to each of even ordered/odd ordered slots regardless of a place in which the first transmission occurs. Such a method may be useful for the case that the UE and the network do not know which the first slot is (e.g., when a direction of slot is changed by the group-common PDCCH).

Cross carrier scheduling: In a scheduled carrier, the rate matching pattern may be dynamically indicated.

Cross BWP scheduling: Since BWP-specific rate matching pattern may be existed, in the case of the cross BWP scheduling like BWP change scheduling DCI, the rate matching pattern may be applied to the scheduled or changed BWP.

Meanwhile, a plurality of time-frequency resource allocations may be used for the rate matching. For example, in the slot-based scheduling, a time-frequency resource allocation in a control region and a time-frequency resource allocation in a data region may be separately indicated. The time-frequency resource allocation in a control region may be performed based on a potential maximum control region size or a semi-statically configured control region size. Accordingly, although a sharing between a control signal and a data is limited in the FDM scheme, and there is no processing for the mini-slot based control signal in the data region, the rate matching pattern may not be required. In addition, in the case that separate time-frequency resource allocations are used, it may be considered to divide the resource region into K regions, instead of dividing the resource region into two regions. Each region may be configured by a higher layer.

The rate matching for a consecutive resource allocation is described. In the case that UL or DL resources are consecutively configured and a reserved resource is partially overlapped with a configured resource or not overlapped with the entire symbol, an additional processing may be required such that the corresponding resources needs to be consecutive even after the rate matching. For example, in the case that the UE is configured with PRBs 0 to 49, and the reserved resource is mapped to symbols k, i and j of PRBs 10 to 15 and 20 to 25, the UE has the nonconsecutive resources of PRB 0 to 9, 16 to 19 and 26 to 49 after the rate matching. To guarantee the consecutive resource allocation even after the rate matching, the following matters may be considered.

(1) Among a fragmented part in the consecutive resource, the UE may use the last fragmented part only. For example, among PRB 0 to 9, 16 to 19 and 26 to 49 in the above example, the UE may use PRB 26 to 49 only. The remaining fragmented parts are not used in the resource allocation. That is, the rate matching may be performed for non-used resources. This is designed for an allocated resource to be consecutively used.

(2) The configuration of the reserved resource may guarantee a consecutive resource allocation after the rate matching. For example, the reserved resource may not be partially configured, but rather the reserved resource may be configured in PRB 0 to 25. However, such a method may restrict a flexibility of scheduling.

(3) A network may schedule such that resources may be consecutively allocated after the rate matching. For example, the resource allocation may be started from PRB 20 and continue, or the resource allocation may be performed from PRB 0 to 15. However, such a method may restrict a flexibility of scheduling in the case that the reserved resource is configured throughout different frequency domain in different symbol or different mini-slot.

(4) In the case that the reserved resource is perfectly or partially mapped to a scheduled frequency domain, the rate matching may be performed in the entire symbol to which the reserved resource is mapped. For example, when the scheduled resource and the reserved resource are overlapped, the UE may not map data in symbols k, i and j.

In addition, depending on a used waveform, different options may be configured or applied. For example, the mechanism of the rate matching described above may be applied to discrete Fourier transform spread OFDM (DFT-s-OFDM) only, and for the OFDM, the rate matching may be applied to the reserved resource only (i.e., continued to non-consecutive resource allocation).

The reserved resource is described in more detail. In allocating resources for data mapping, it is required to define a resource which may not be used for the reserved resource or data mapping more clearly. For data mapping, the reserved resource to be rate-matched may be existed. For example, LTE-NR coexistence, in order to guard the PDCCH region and the CRS symbol of LTE, the NR data is required to be mapped by avoiding the PDCCH region and the CRS symbol of LTE. The CRS symbol of LTE may be configured with semi-static reserved resource for the corresponding slot. The following matters may be considered for the PDCCH region of LTE.

(1) Semi-static configuration of the PDCCH region of LTE: In order to guard the PDCCH region of LTE, the semi-static reserved resource may be configured for a control signal and a data. For example, for subcarrier spacing of 15 kHz, 3 symbols may be configured as the reserved resource. In such a case, in the case that the PDCCH region which is carried by smaller than 3 symbols is used, a part of reserved resource may be wasted.

(2) Semi-static configuration of the PDCCH region of LTE for a control signal and dynamic signaling of the reserved resource for data: The semi-static reserved resource may be configured for a control signal. Alternatively, for each CORESET, a starting point and period of the control signal may be configured. This is because the dynamic signaling of the control signal is not intuitive. In addition, a starting symbol may be dynamically indicated for data. For example, in order to guard the PDCCH region of LTE, the starting symbol of the control region may be defined as the fourth symbol, and the data may be started even before the fourth symbol depending on a size of the PDCCH region of LTE. Accordingly, a case may occur that the data is started before the control region is started.

(3) Dynamic indication of the PDCCH region of LTE for a control signal and a data: In order to maximize resource availability for both the control signal and the data, the reserved resource may be dynamically indicated for the control signal and the data. In order to enable for the control signal to indicate the reserved resource dynamically, the UE may be required to perform blind decoding more times. For example, the starting symbol of the control region is defined as the second symbol, and the UE may perform blind decoding in each symbol up to the symbol configured with the control region. This may increase UE complexity. The dynamic indication of the reserved resource for the control signal and the data may be implemented by configuring a mini-slot based control channel monitoring. For example, the control channel monitoring may be performed in every symbol.

Figure 6:
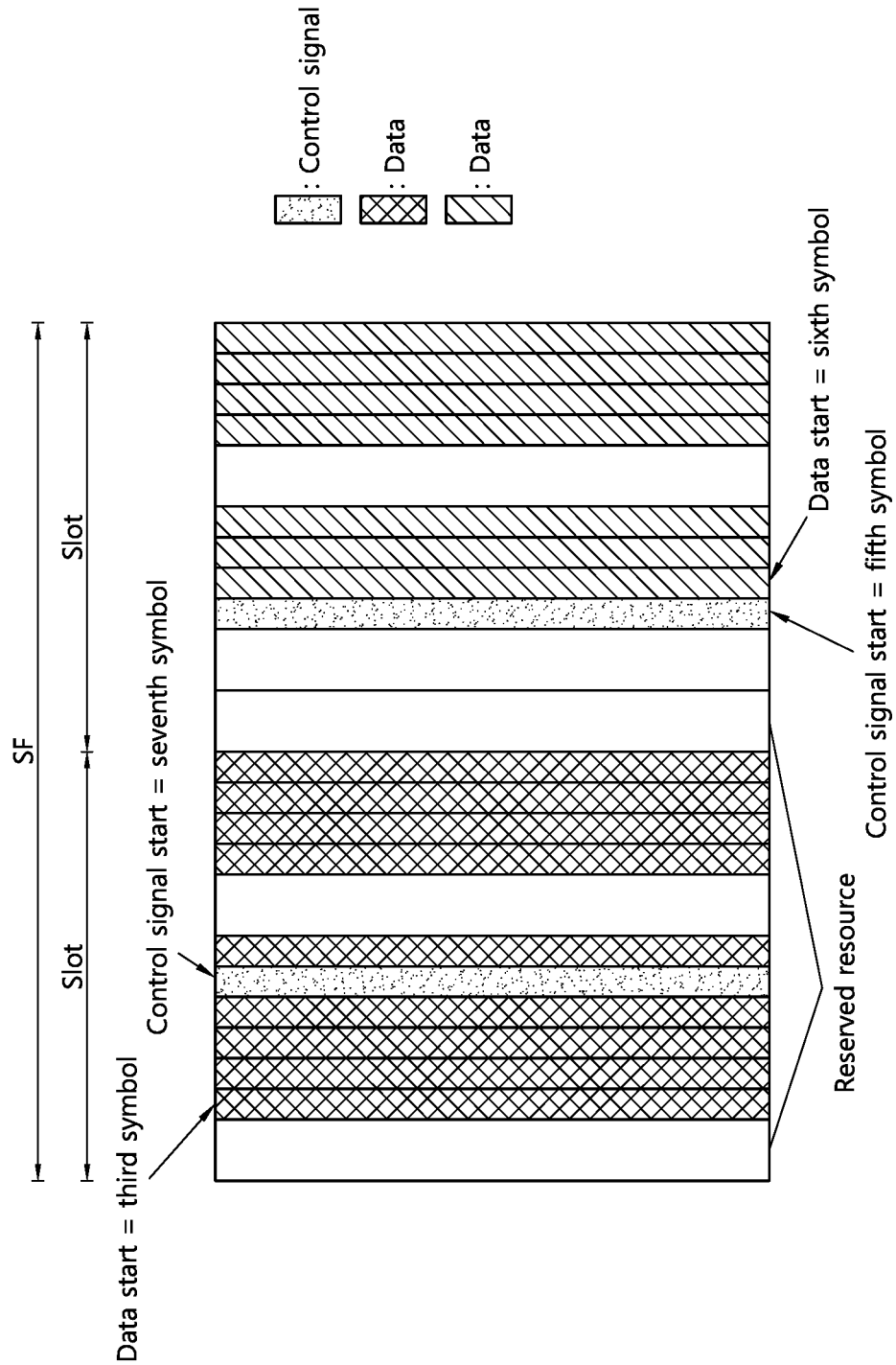
FIG. 6 shows an example of the case that LTE and NR coexist according to an embodiment of the present disclosure.

FIG. 6 shows an example of the case that LTE and NR coexist according to an embodiment of the present disclosure. For the coexistence of LTE and NR, as described above, the starting symbol and period for the control region may be semi-statically configured, and the starting symbol for the data may be dynamically indicated. The data may occur before a start of the control region. FIG. 6 shows an example that LTE and NR using 30 kHz subcarrier spacing are coexisted. Referring to FIG. 6, in the first slot, the data starts in the third symbol, and the control regions starts in the seventh symbol. That is, the data starts before the control region. In the second slot, the data starts in sixth symbol, and a control region starts in the fifth symbol.

In the case that the slot base scheduling is supported in a normal subframe, different CORESET starting positions may be configured for each slot, and the starting point of the data may be dynamically indicated. In the case that the mini-slot based scheduling is supported and the UE reads CORESET more frequently (e.g., in every symbol), the control signal and the data may be mapped to non-PDCCH region and/or non-CRS symbol.

Meanwhile, in relation to the reserved resource, the following matters may be additionally considered.

(1) Cross-slot scheduling: NR-PUSCH and NR-PDSCH may be scheduled throughout a plurality of slots in various reasons. In the case that the cross-slot scheduling is used, in a given slot, in order to enable a transmission of DL control signal and UL control signal to be available, a reserved resource for data mapping may be required. In addition, a reserved resource for CSI-RS and/or SRS transmission may be required, and a dynamic indication for mapping in the data region in each slot may be required.

(2) Time division multiplexing (TDM) between different numerologies: For example, in the case that different numerologies are used between CSS and UE-specific search space (USS), under the assumption that the UE support a single numerology in a timing, the UE is required to monitor each search space in different symbols. In such a case, data may not be mapped to a symbol, and different numerology may be used from the data.

Meanwhile, in the case that the UE is scheduled with multi-slot NR-PUSCH, and time domain bundling is also configured, even in the case that the UE is configured with the control channel monitoring to guarantee phase continuity of UL transmission, the UE is not required to be changed for DL monitoring during the time domain bundling unit. Even in this case, the configured CORESET may be rate-matched for NR-PUSCH data transmission.

In summary, in order to process various cases for the rate matching of data, the following matters may be considered.

(1) A UE may be indicated with a starting symbol for NR-PUSCH through DCI, and the corresponding starting symbol may indicate earlier symbol than the starting symbol for CORESET.

(2) For an efficient resource use, a dynamic indication of a resource to which data is not mapped may be required.

Hereinafter, a resource allocation mechanism is described. For various reserved resources and to indicate the rate matching for data, different resource allocation mechanism may be considered as below.

(1) Time domain resource allocation in a scheduling unit: A reserved resource may be dynamically indicated in symbol level. For example, a bitmap in a scheduling unit size may be used for indicating the reserved resource. The scheduling unit size may be defined as a size of maximum scheduling unit for which the UE may be scheduled. The size of maximum scheduling unit may be configured for each UE-specific data and common data for each UE. The size of maximum scheduling unit may be configured by PBCH or SI. In order to reduce the size of bitmap, symbols may be grouped. Further, in order to reduce the size of time domain resource allocation, a consecutive resource mapping may be considered. However, this may not be efficient for indicating a dynamic resource with the reserved resource in the middle of the scheduling unit. Alternatively, in a set of the configured dynamic reserved resource patterns, the UE may be indicated with a pattern index.

(2) Time domain resource allocation in a slot: In the case that the cross-slot scheduling or the multi-slot scheduling is configured, the corresponding time domain resource allocation may be repeated throughout a plurality of slots. The dynamic indication of the time domain resource based on the maximum scheduling unit (i.e., section (1) described above) may have big overhead depending on a size of scheduling unit. Considering the overhead, the time domain resource may be scheduled in a slot, and the same pattern may be the same in slots on the scheduling unit. A disadvantage of such a method is that different reserved resource pattern may not be considered in different slot. For example, this is the case of rate matching in periphery of CSI-RS and/or SRS. Therefore, in the case that at least a UE is scheduled in a slot through the cross-slot scheduling, the indication for the rate matching may be applied to the slot in which actual data is transmitted or received.

(3) The reserved resource may be determined based on the group-common PDCCH. That is, the reserved resource in each slot may be indicated by the group-common PDCCH. A disadvantage of such a method is that data transmission/reception performance of UE may be degraded when the UE is unable to detect the group-common PDCCH stably.

In summary, the following matters may be considered.

(1) A dynamic indication of the reserved resource or an indication based on the group-common PDCCH may be considered.

(2) For control channel monitoring before NR-PUCCH transmission, a starting symbol of the NR-PUSCH may be indicated.

(3) For rate matching in periphery of CSI-RS and/or SRS, the last symbol of NR-PDSCH and NR-PUSCH may be indicated. Particularly, when CSI-RS and/or SRS use different numerology from data, it may be required to empty the entire symbols according to the UE capability.

Meanwhile, for TBS calculation, the following matters may be considered.

TBS may be determined based on a valid REs after applying the rate matching pattern (in this case, some amount of rough unit may be required).

TBS may be determined based on the entire REs determined by the number of slots or the number of symbols.

TBS may be determined based on the number of scheduled RBs and the number of scheduled symbols except a completely rate-matched symbol.

TBS may be determined based on the factor described above and a scaling factor indicated in DCI. This may mean that TBS may be designated without assuming the rate matching pattern by the time domain resource allocation designated by the scheduling DCI.

TBS may be determined based on a reference RE determined based on a reference configuration based on scheduled RBs, a scheduled slot size or slot number and a scaling factor indicated in DCI. This may mean that TBS may be designated without assuming the rate matching pattern by the time domain resource allocation designated by the scheduling DCI.

3. UE Operation Related to the Rate Matching

First, a UE operation related to the rate matching in UL is described. It is assumed that only a consecutive time/frequency resource is configured in the UE.

(1) Unicast PUSCH/PUCCH: A dynamic resource selection may be used. In the case that the dynamic resource selection is not used, when a UL transmission is terminated until the rate matching pattern is started (i.e., the UL transmission is not consecutive) or the rate matching pattern overlapped with the UL transmission is existed, the entire UL transmissions may be omitted.

(2) Semi-static or grant-free UL transmission in which the dynamic resource selection is hard to be used/physical random access channel (PRACH) transmission/scheduling request (SR) transmission In the case that the rate matching pattern is overlapped with UL transmission partially or completely, the entire UL transmissions may be omitted.

A period of the UL transmission may be determined by a starting position and a last position thereof. The starting position may be identical to the indicated starting symbol or the greater and first usable (i.e., not overlapped with the rate matching pattern) symbol. The last position may be the last usable symbol before the first rate matching pattern in a time domain. That is, only the consecutive transmission may be supported.

Unless the rate matching pattern is throughout K symbol (e.g., K=1) or more, the UL transmission may be determined based on the rate matching. In the case that the rate matching pattern is throughout K symbol or more, the first or second method described above may be applied.

Different operations may be configured for different waveforms or different channels. For example, for the PRACH, the first method (i.e., transmission omission) may be used/configured, and for the PUSCH/PUCCH, the second method may be used/configured.

(3) SRS: Only consecutive fragments of SRS transmission may be considered. In the case that a plurality of consecutive fragments is existed, the UE may transmit by selecting the biggest fragment, or the UE may transmit by randomly selecting. In the case that a part overlapped with the reserved resource is existed, the entire SRS transmission may be omitted. In addition, a plurality of SRS configurations may be configured/indicated, and the UE may select at least one SRS configuration that is not overlapped with the reserved resource among a plurality of SRS configurations. In the case that a transmission comb is used, it is required to define clearly that the SRS resource may not be overlapped with other SRS resources. In the case that the transmission comb is used, and the rate matching pattern is not overlapped with the SRS, the SRS may be transmitted.

(4) Long PUCCH

A period of a long PUCCH may be implicitly determined by determining the starting/last symbol as described above. Alternatively, a period of the long PUCCH may be determined by considering the information transmitted by DCI additionally. After the period of the long PUCCH is determined, a DM-RS pattern and/or a hopping pattern may be determined. Alternatively, a PUCCH may be transmitted regardless of the rate matching configuration. That is, a PUCCH transmission may disregard the rate matching configuration.

An operation of UE related to the rate matching in DL is described. Basically, the UE operation in DL may be similar to the UE operation in UL. Within a single transmission, the number of maximum symbols that may be consecutively rate-matched in a time domain may be present. A single transmission may not occur through such a rate matching pattern. Alternatively, in such a case, at least different DM-RSs may be transmitted. For example, two or more fragments may be treated as a plurality of mini-slots, and in each mini-slot, an independent DM-RS may be transmitted. A single TB may be mapped to a plurality of mini-slots or repeated on a plurality of mini-slots. In other words, scheduling is performed based on the slot based scheduling or consecutive scheduling, and a DM-RS transmission and a data mapping may be followed based on the mini-slot based scheduling.

The following matters may be considered for a frequency. In a frequency having both DL/UL, non-consecutive transmission may not be used.

Particularly, in the frequency having both DL/UL, in the case that the rate matching is performed in the symbol in which a DM-RS is transmitted, various options may be considered. First, 1) In the case that the corresponding symbol is a symbol in which a front-loaded DM-RS is transmitted, the entire PRBs may be rate-matched on the entire symbols in a scheduled period. A similar mechanism may also be used in the case that an additional DM-RS is transmitted. Alternatively, 2) in the case that the mini-slot based scheduling is used, regardless of whether it is the first or second DM-RS, the entire PRBs may be rate-matched. Alternatively, 3) a DM-RS may be deferred to a symbol which is not rate-matched. Alternatively, 4) a first DM-RS position may be determined by the rate matching pattern, and the first symbol in which the rate matching is not performed may be selected among candidate positions for a DM-RS transmission. Meanwhile, the method described above may be applied to the front-loaded DM-RS only, and the additional DM-RS may always be transmitted in the case that the additional DM-RS is not rate-matched.

The rate matching pattern may not be applied to a DM-RS. Regardless of a configuration, when PRB/symbol is scheduled, a DM-RS may be transmitted according to the configuration.

In the case that the DFT-s-OFDM is used for at least UL carrier, a frequency position is also required to be adjusted according to the rate matching pattern in similar way to the time domain. For example, the first PRB may be determined as the first PRB which is not overlapped with the rate matching pattern after a scheduled PRB. The last PRB may be determined as the last PRB of the scheduled PRBs among the consecutive PRBs after the first PRB or determined as the PRB which is firstly rate-matched in any symbol in the scheduled resources after the first PRB.

In the case that the UE is moving or configured to monitor different initial DL BWP or default BWP from an initial DL BWP firstly accessed for an IDLE state, it is required to configure the rate matching pattern in a cell-specific configuration. For this, when at least the rate matching pattern is configured locally for each SS block, different rate matching patterns may be configured in cell-specific or UE-specific manner for different SS blocks. For example, the rate matching pattern for each SS block may include the resources associated with different SS block indexes (time/frequency resource or time resource or frequency resource). According to the association relation between the rate matching pattern and the SS block index, the UE may apply different rate matching patterns according to a current BWP position. Alternatively, in the case that a BWP different from the initial DL BWP is used for the paging or random access procedure, the rate matching pattern may be configured for each BWP for the paging or for each BWP for the random access procedure. Alternatively, the UE may be indicated with RMSI scheduling information, and the UE may not copy a transmission when BWP is changed, but rather, the UE may read the RMSI for the rate matching pattern. Alternatively, the rate matching pattern may be indicated from a network through a UE-specific signaling. That is, in the case that the UE is outside of the rate matching pattern which is configured in the cell-specific manner in a frequency domain, the UE may receive UE-specific signaling for the rate matching pattern, or the UE may receive RMSI information so as to read the RMSI in a new frequency domain.

Meanwhile, when the rate matching pattern is disregarded (e.g., for DM-RS/PUCCH/PRACH), it is required to clearly define whether only the rate matching pattern indicated dynamically is disregarded for the corresponding channel. For this, the rate matching pattern which is semi-statically configured may be applied to the corresponding channel. Particularly, for the PRACH, only the rate matching pattern which is configured in cell-specific manner may be applied. This is because a network is unable to know which UE uses the PRACH resource. Particularly, the rate matching pattern which is configured in cell-specific manner may applied to a contention-based PRACH resource only. When the rate matching pattern which is configured in cell-specific manner is overlapped with a DM-RS (at least the front-loaded DM-RS)/PRACH/default PUCCH (e.g., HARQ-ACK for Msg 4) transmission, the rate matching pattern which is configured in cell-specific manner may not be applied, or a transmission of DM-RS/PRACH/PUCCH may be delayed. Alternatively, a slot or symbol reserved by cell-specific configuration may not be considered when determining a timing in order to prevent a collision with a reserved resource. Alternatively, for PRACH/paging related data transmission (e.g., PDSCH/PUSCH), data channel period (which may include starting/last symbol index) may be configured in cell-specific manner by the RMSI. Alternatively, a plurality of starting/last symbols may be configured, and different set may be selected according to the rate matching pattern. For example, a maximum period without collision with the rate matching pattern may be selected.

Alternatively, for the cell-specific rate matching pattern, the following restrictions may be applied.

The reserved resource may be started only in consecutive K symbols from the first symbol or started only the last symbol of a slot from before K symbol from the last symbol in the slot.

In the slot indicated by at least signaling (or slot according to a period or a time pattern), the entire PRBs may be reserved.

In the RMSI scheduling, except the candidate SS block, a reserved resource may not be present. For this, the following matters may be considered.

A starting symbol for data may be configured semi-statically or dynamically indicated.

Unless a configuration is not provided, the same symbol as the symbol in which CORESET configuration is started in a given slot may be used as a starting position of the data. Alternatively, the first symbol of a slot may be used as a starting position of PDSCH/PUSCH.

For the PUCCH (or Msg 3), starting/last symbol may be configured semi-statically or indicated dynamically by RAR. In the case that the both are not available, the first symbol may be used as the starting position, or according to a timing between UL grant and PUSCH, the next symbol of CORESET+k2$^{th}$ (processing time of PUSCH) symbol may be used as the starting position.

For the RMSI CORESET, regardless of whether the reserved resource is shared with other channel such as RAR, the configured reserved resource may not be applied. In addition, for other broadcasting PDSCH and CORESET (except the RMSI CORESET), the rate matching pattern configured by the RMSI may be applied.

For other CORESET, the rate matching pattern configured in UE-specific manner may not be applied. Alternatively, for the CORESET configured only for at least USS, the rate matching pattern configured in UE-specific manner may not be applied. Alternatively, the UE operation may be configurable. At least the rate matching pattern which is configured in UE-specific manner and dynamically indicated may not be applied to the CORESET.

For other PDSCH (cell-specific PDSCH), only the rate matching pattern which is configured semi-statically according to the cell-specific configuration may be applied. Alternatively, even for the UE-specific configuration, it may be indicated whether the rate matching pattern is required for broadcasting data.

The rate matching pattern applied to data may be indicated by a combination of {CORESET, SS block}.

In the case that the slot based scheduling is applied and a DM-RS collides with a reserved resource, the UE may use the mini-slot based scheduling in the corresponding slot. This may be indicated explicitly by DCI, or a configuration for subset of a slot for the slot based scheduling and the mini-slot based scheduling, or search space division configuration or DCI format division configuration, etc. That is, the UE may support the slot based scheduling or DM-RS type A, and the DM-RS may be present in the third or fourth symbol of the subset of a slot. Alternatively, the UE may support the mini-slot based scheduling or DM-RS type B, and the DM-RS may be present in the first starting symbol of data region. It depends on the UE capability whether a plurality of configurations is supported in a slot. Each DM-RS type may be selected dynamically in order not to collide with the rate matching pattern. In addition, the DM-RS pattern including a symbol in which the DM-RS is present may be dynamically configured.

Meanwhile, the cell-specific rate matching pattern and the UE-specific rate matching pattern may be applied to UE-specific data. In addition, the cell-specific rate matching pattern may be applied to the cell broadcasting data except the RMSI and applied to the COREST except the RMSI COREST. Further, the cell-specific rate matching pattern may be applied to SS block for the RMSI PDCCH or SS block for which the UE monitors the RMSI PDCCH. In addition, the cell-specific rate matching pattern may be applied to RS/PRACH transmission.

When one or more PRBs are rate-matched, the entire PRBs that use the same precoding as the one or more rate-matched PRBs may also be rate-matched. The rate-matched PRB may not be included in the TBS calculating. In addition, the symbol which is rate-matched entirely may also not be included in the TBS calculating. Alternatively, the PRB bundling may not be influenced by the rate matching, and only the rate-matched PRB may not be used.

Alternatively, when one or more PRBs are rate-matched, this may depend on a DM-RS or data. In the case of DM-RS, the entire PRB bundles including data may be rate-matched. In the case of data, only the PRB of the rate matching pattern may be used. That is, in a frequency domain, in the case that the rate matching is performed for the DM-RS, the PRB that shares the same precoding may also be rate-matched.

In the case of broadband RS transmission, only the PRB of the rate matching pattern may not carry an RS. In this case, data may be transmitted. That is, in the case of an RS transmission in the CORESET, the rate matching of the RS and a control signal may follow the rate matching pattern when the control signal is rate-matched. In the case that the DM-RS and the rate matching pattern collide, and either one of them is delayed or changed, the description above may not be applied.

In addition, the rate matching pattern may be applied after interleaving (i.e., for physical resource).

In the case that different configurations are applicable, it is required that the following matters are clearly defined.

(1) CORESET in relation to rate matching pattern set and SS block which is actually transmitted: In the case that information for a rate matching pattern set and SS block which is actually transmitted is usable, the UE may assume that REG/CCE is mapped to the configured CORESET. In this case, the following operations are available.

- REG may be rate-matched in the RE which is overlapped with an indicated resource (e.g., actually transmitted SS block or rate matching pattern set or fixed UL resource). That is, the REG may be rate-matched in unusable REs in RE level.
- In the case that at least one RE is overlapped with an indicated resource (e.g., actually transmitted SS block or rate matching pattern set or fixed UL resource), the entire REGs may be rate-matched on a PRB.
- In the case that at least one RE is overlapped with an indicated resource (e.g., actually transmitted SS block or rate matching pattern set or fixed UL resource), the entire REG bundles may be rate-matched on a REG. Considering mis-alignment between PBCH PRB grid and PRB grid of other channel, in the case that the rate matching is performed in REG level, the rate matching may be performed in the REG level for SS block of 21 PRBs rather than SS block of 20 PRBs.
- In the case that at least one RE is overlapped with an indicated resource (e.g., actually transmitted SS block or rate matching pattern set or fixed UL resource), the entire CCEs may be rate-matched on the REG.
- In the case that at least one RE is overlapped with an indicated resource (e.g., actually transmitted SS block or rate matching pattern set or fixed UL resource), the entire PDCCHs may be rate-matched on the REG.

That is, in the case that the reserved resource and the rate matching pattern are overlapped, the rate matching may be considered in RE level, REG level, REG bundle level, CCE level or PDCCH candidate level.

(2) Actually transmitted SS block or PDSCH on UL: Similar to the method described above, the rate matching may be considered in RE level, PRB bundle level, CCE level or symbol level.

(3) CSI-RS/PT-RS or other RS: In the case that DFT-S-OFDM or DFT is not used, the rate matching may be performed in RE level, or the entire symbols may be rate-matched. Alternatively, a bandwidth adaptation may be performed by semi-static configuration or dynamic indication.

(4) Information for SS block actually transmitted and rate matching pattern or UL resource indicated by cell-specific signaling: The UE may expect that the actually transmitted SS block is not indicated by a UL resource or the rate matching pattern. Alternatively, for the purpose of the rate matching, a union of resource sets for the SS block actually transmitted, the rate matching pattern and the UL resource may be used. In addition, for the purpose of a measurement, a measurement configuration may follow. That is, SS block configured for a measurement may not be changed to the UL resource at least. In a resource in which SS block is not rate-matched, the rate matching pattern may be configured. In other words, the SS block may be transmitted following the measurement configuration. The union of the configuration of the rate matching pattern for the purpose of the rate matching may include the followings.

- SS block actually transmitted
- Set of the rate matching patterns semi-statically configured
- Set of the rate matching patterns dynamically indicated
- Fixed UL resource semi-statically configured
- UL resource indicated by dynamic slot formation indication (SFI)

(5) Information for SS block actually transmitted and rate matching pattern or UL resource indicated by UE-specific signaling: This may be supported when a union of configurations of the rate matching patterns for data mapping. For the purpose of a measurement, a measurement configuration may follow. That is, SS block configured for a measurement may not be changed to the UL resource at least. In a resource in which SS block is not rate-matched, the rate matching pattern may be configured. In other words, the SS block may be transmitted following the measurement configuration. The union of the configuration of the rate matching pattern for the purpose of the rate matching may include the followings.

- SS block actually transmitted
- Set of the rate matching patterns semi-statically configured
- Set of the rate matching patterns dynamically indicated
- Fixed UL resource semi-statically configured
- UL resource indicated by dynamic slot formation indication (SFI)

(6) PRACH/PUSCH/PUCCH: In UL, the rate matching may be performed in the starting position or the last position of each transmission by adjusting or selecting different transmission periods. This means that different PRACH formats may be selected when a UL transmission collides with the rate matching pattern or a DL resource.

Meanwhile, the PRACH resource may be valid in the following cases.

- When the PRACH is configured by a higher layer
- When the PRACH is not redefined as a DL resource by semi-static DL/UL configuration
- When the PRACH is not redefined as a DL resource by UE-specific DL/UL configuration
- When the PRACH is not redefined as a DL resource by SFI
- In an unknown or flexible resource by SFI or DL/UL configuration, at least contention-based PRACH may be transmitted. For contention-free based PRACH, a resource may be indicated only on a UL resource. That is, when an indicated resource collides with an unknown resource or flexible resource, the corresponding PRACH transmission may be omitted.

(7) SRS: In the case that the SFI is configured, a semi-static SRS may be validated to a UL transmission by the SFI. Otherwise, SRS may be transmitted according to a configuration. In addition, a non-periodic SRS may be transmitted in an unknown resource or a UL resource. When the SRS is partially overlapped with a reserved resource, a DL resource or an unavailable resource, one of the followings may be considered.

- Transmissions of the entire SRSs may be omitted.
- Transmission of SRS may be omitted in the overlapped PRB.
- Transmission of SRS may be omitted in the overlapped RE.
- Different operation may be configured according to waveform configuration. For example, transmissions of the entire SRSs may be omitted in the SC-FDMA, and a transmission of SRS may be omitted in the overlapped part in the OFDM.

(8) RAR window: In calculating RAR window, a UL resource configured by a semi-static DL/UL configuration and/or the SFI or an unknown resource or a flexible resource only may be considered. Alternatively, regardless of a resource type, the RAR window may be calculated.

(9) Msg 3 timing: In calculating a timing of Msg 3, a UL resource configured by a semi-static DL/UL configuration and/or the SFI or an unknown resource or a flexible resource only may be considered. Alternatively, only a UL resource may be considered. Alternatively, regardless of a resource type, the timing of Msg 3 may be calculated.

(10) Msg 3 repetition period: When Msg 3 is repeated in a multi-slot, in calculating the repetition, a UL resource configured by a semi-static DL/UL configuration and/or the SFI or an unknown resource or a flexible resource only may be considered. Alternatively, only a UL slot may be considered. Alternatively, a slot including at least K number of UL symbols or unknown symbols only may be considered. K is a period for Msg 3 transmission in a slot. Alternatively, a slot including at least K1 number of UL symbols or unknown symbols only may be considered. K1 may be configured by a higher layer. Alternatively, regardless of a resource type, the repetition period of Msg 3 may be calculated.

(11) PUCCH resource indication in a time domain: a resource may be configured only in a plurality of slots (e.g., 1, 2, 4, . . . ), and a selected value may be applied throughout a slot regardless of a resource type. Alternatively, a resource may be configured regardless of whether all slots are considered or only UL slot is considered, or UL slot/unknown slot is considered. That is, counting the number of slots in a resource set may be configured by a resource set configuration for a PUCCH timing resource.

4. Cross Carrier/Cross BWP Scheduling

In the case that a PDSCH is scheduled by different carrier, the rate matching pattern may be changed. Particularly, the rate matching pattern related to a control signal may be changed. In the case of the cross carrier scheduling, the following cases may be considered.

(1) The same numerology may be used between a scheduling carrier and a scheduled carrier of the same slot size.

(2) The same subcarrier spacing having different cyclic prefix (CP) overhead may be used between a scheduling carrier and a scheduled carrier of the same slot size.

(3) The scheduling carrier having greater subcarrier spacing may schedule a PDSCH in a carrier of smaller subcarrier spacing.

(4) The scheduling carrier having smaller subcarrier spacing may schedule a PDSCH in a carrier of greater subcarrier spacing.

A data scheduling symbol may be dynamically indicated by DCI. In the case that the dynamic indication is not used, an offset from the first symbol in a slot may be indicated in a symbol unit, a mini-slot unit or a slot unit.

Meanwhile, the rate matching pattern may follow the rate matching pattern of a scheduled carrier. Case (4) described above may be processed in the same way as the case of multi-slot.

In the case that the cross BWP scheduling is used, and different numerologies are used between a control signal and a data, whenever a potential CORESET for control BWP is monitored, the UE may perform the rate matching for the entire symbols without an explicit configuration. However, this may not be applied to the rate matching of the cross carrier scheduling. That is, an implicit rate matching due to the CORESET of different numerologies may be considered. In addition, like the common data from the numerology used in an active BWP, this may also be applied to the case that the UE is required to monitor different numerologies for a control signal and a data.

5. Rate Matching Pattern and Indication Method

For the rate matching pattern, one of the following options may be considered.

(1) Option 1: For each symbol, a set of the rate matching patterns may be semi-statically configured, and one of them may be dynamically indicated. The rate matching pattern may be a bitmap (e.g., 12 bits) of RE level, and the configured bit may indicate that the rate matching pattern is used for other purpose except data mapping. As an example of the rate matching pattern, the entire symbol may be emptied.

For a frequency domain to which the selected rate matching pattern is applied, one of the followings may be considered.

Unless separately indicated, the rate matching pattern may be applied to the entire active BWPs.

Additional information for a frequency domain to which the rate matching pattern is applied may be configured.

A set of a plurality of rate matching patterns may be configured, and each set may be configured in a frequency domain. When a plurality of sets is configured, the rate matching pattern may be individually indicated for each frequency domain A set of a plurality of rate matching patterns may be configured, and each rate matching pattern may be indicated together with frequency information. The corresponding frequency may be consecutive or non-consecutive.

In option (1), the bit number of an indicator indicating the rate matching pattern may be K*M. K is the number of required bits for each symbol, and M is a scheduling unit.

Alternatively, instead of different rate matching patterns defined per each symbol, a single rate matching pattern selected for each symbol may be repeated during a scheduling unit. This may be efficient when the mini-slot scheduling is used, particularly. It may be separately indicated whether the same rate matching pattern is used.

Option 1 may be extendedly applied to when the multi-slot scheduling is used.

(2) Option 2: For each mini-slot (or in every K symbol), a set of the rate matching patterns may be semi-statically configured, and one of them may be dynamically indicated. The rate matching pattern may be a bitmap (e.g., 12 bits) of RE level, and the configured bit may indicate that the rate matching pattern is used for other purpose except data mapping. Information for time-frequency domain resource to which the rate matching pattern is applied may be configured for each rate matching pattern.

In option 2, the bit number of an indicator indicating the rate matching pattern may be K1*M1. K1 is the number of required bits for each mini-slot, and M1 is a value of M divided by a size of mini-slot.

Meanwhile, instead of a plurality of rate matching patterns per mini-slot, like in option (1), the same rate matching pattern may be repeatedly used.

(3) Option 3: For each slot, a set of the rate matching patterns may be semi-statically configured, and one of the rate matching patterns may be dynamically indicated.

(4) Option 4: For each P slot, a set of the rate matching patterns may be semi-statically configured, and one of the rate matching patterns may be dynamically indicated. Regardless of a slot in which a scheduling is occurred, the rate matching pattern may be started in every P slot. In the case that a single slot scheduling is performed in slot P-2, the rate matching pattern in slot P-2 may be applied to a scheduled PDSCH. In the case that the multi-slot scheduling is performed throughout two P slots, for each P slot, two rate matching patterns may be indicated.

(5) Option 5: A UE may be configured with a subset of a plurality of slots, and the subset of each slot may be configured with a set of the rate matching patterns. For each slot, an indication of the rate matching pattern may be applied to the configured set of the rate matching patterns. For example, in the case that CSI-RS is configured in every 5 slots, the rate matching pattern including the CSI-RS may be configured with every 5 slots. In addition, in every 5 slots, the UE may be configured with a set of different rate matching patterns.

In the case of the cross carrier/subframe scheduling, the rate matching pattern on a slot in which a PDSCH is scheduled may be used for the rate matching. In the case that in the multi-slot scheduling, the scheduled PDSCH belongs to a subset of different slots in which different rate matching patterns are configured, an indication for the different rate matching patterns may be performed. In the case that two slots are belonged to a subset of the same slot for a configuration of the rate matching pattern, the same rate matching pattern may be applied to two slots. For the slot in which the same rate matching pattern is applied, a duplication may be detained in order to reduce signaling overhead.

Meanwhile, in the case that option 5 is used, a size of bit required for a dynamic indication per subset of each slot may be changed depending on the number of configured the rate matching patterns. In order to process a potential size change of DCI, a size of bit indicating the rate matching pattern may be matched to the biggest size or a fixed value may be used. The fixed value may be used by a network by adjusting the number of slots which is scheduled at a time.

In addition, in option 5, a set of different rate matching patterns may be configured for each subset of a slot.

Figure 7:
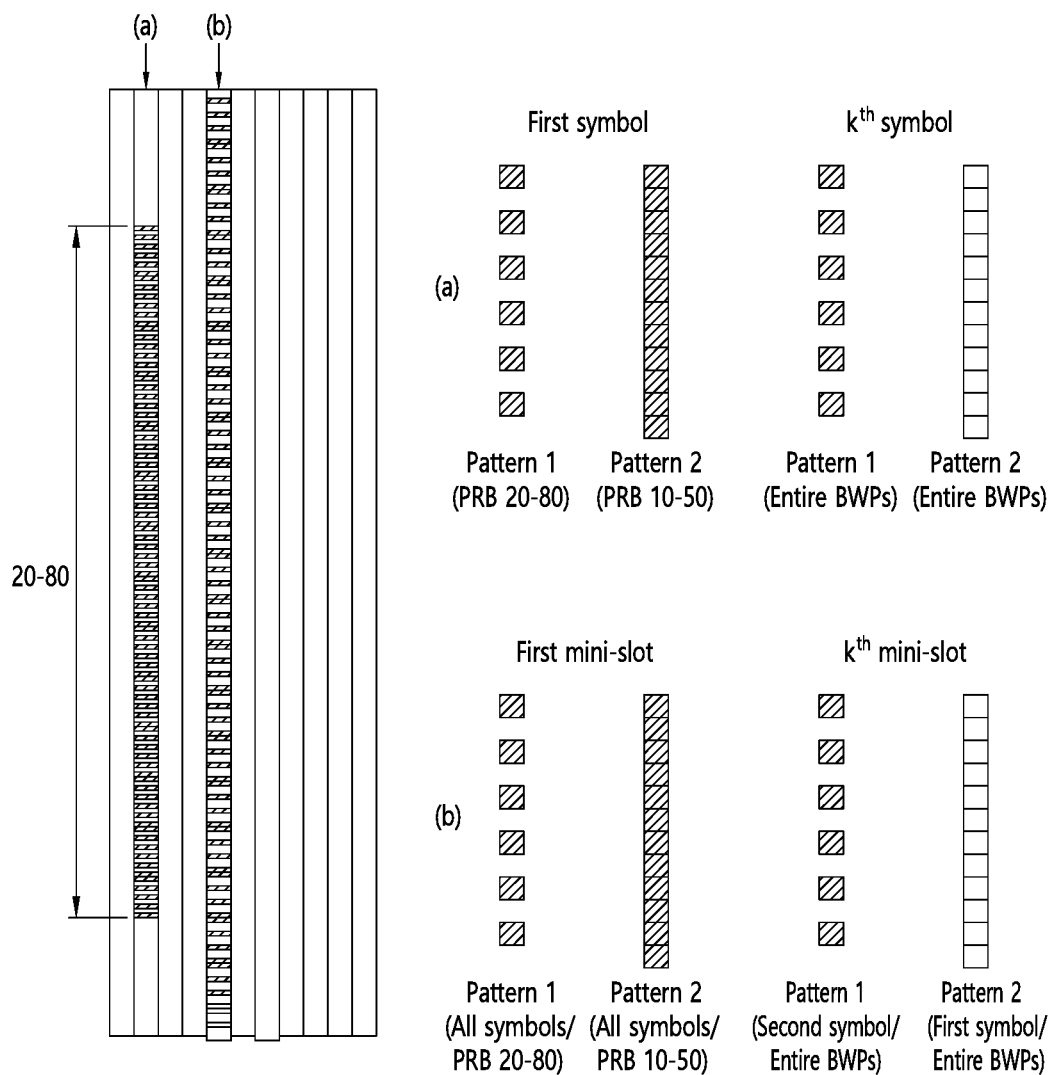
FIG. 7 shows an example of the rate matching pattern according to an embodiment of the present disclosure.

FIG. 7 shows an example of the rate matching pattern according to an embodiment of the present disclosure. FIG. 7-(a) shows the case that option 1 described above, i.e., the case that a set of rate matching patterns is semi-statically configured for each symbol, and one of them is dynamically indicated. FIG. 7-(b) shows the case that option 2 described above, i.e., the case that a set of the rate matching patterns may be semi-statically configured for each mini slot, and one of them may be dynamically indicated.

Figure 8:
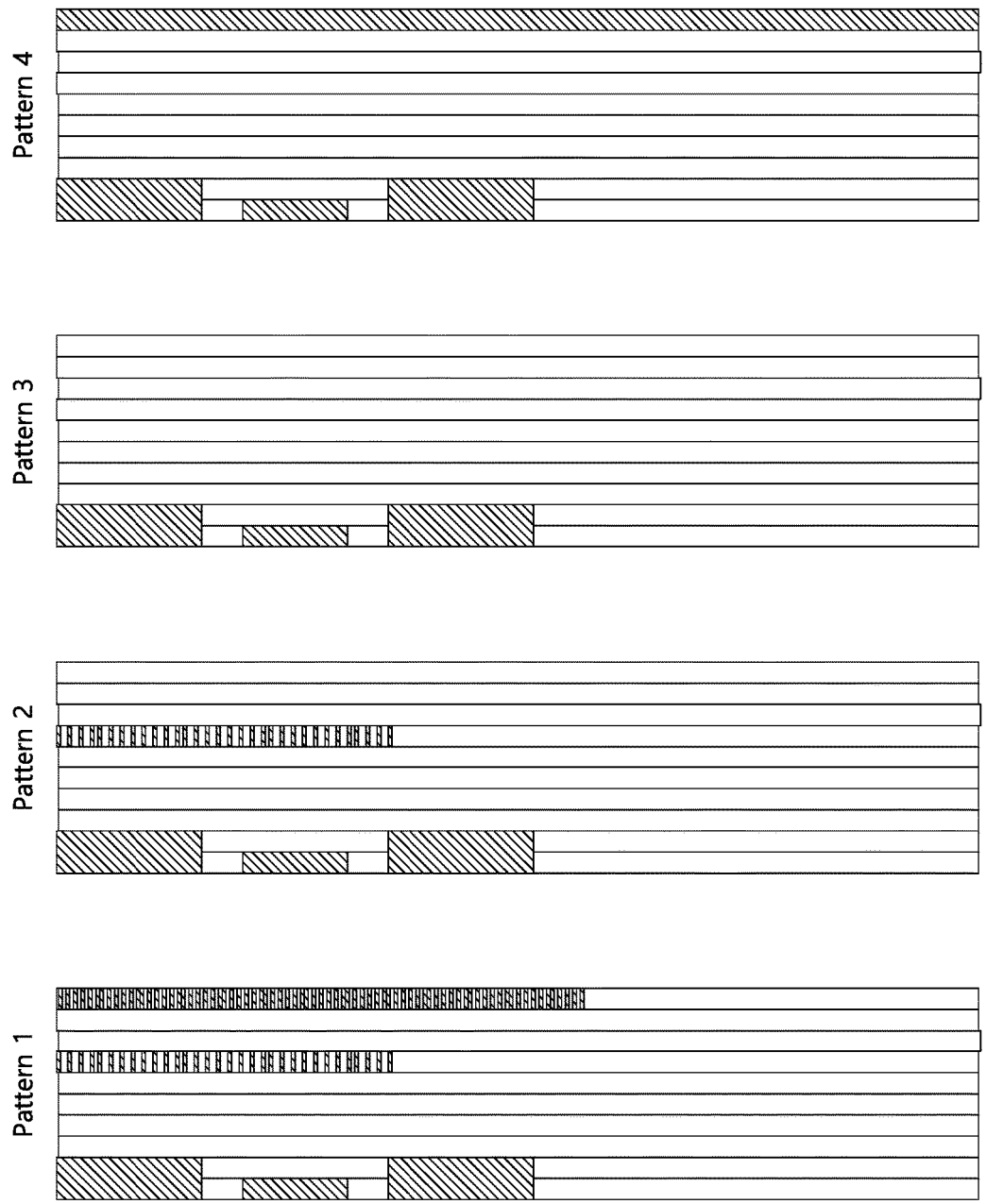
FIG. 8 shows another example of the rate matching pattern according to an embodiment of the present disclosure.

FIG. 8 shows another example of the rate matching pattern according to an embodiment of the present disclosure. FIG. 8 shows the case that option 3 described above, i.e., the case that for each slot, a set of the rate matching patterns may be semi-statically configured, and one of the rate matching patterns may be dynamically indicated.

Regardless of which option is used among the options, a set of different rate matching patterns may be configured for each configured BWP. In addition, the UE may apply a semi-static rate matching pattern. Further, the rate matching pattern may be indicated by a group-common PDCCH.

Processing of a plurality of transmission/reception points (TRPs) is described. When the UE is connected to a plurality of TRPs, a control signal and a data may be transmitted from different TRPs. Therefore, a set of rate matching patterns may be configured for each TRP, and the indicated state may be differently interpreted according to information of a transmitter and information of a receiver. In order to support this, the following matters may be considered.

An indication for the rate matching pattern may be distinguished between a control region and a data region. Since different beams or different TRPs may be used, a set of rate matching patterns may be configured independently for each control region and data region, and further, an indication for the rate matching pattern may be indicated individually through DCI. For the control region, a set of rate matching patterns may be applied for data mapping in the control region/symbol, and in the data region, a set of rate matching patterns may be individually configured and dynamically indicated.

An indication for the rate matching pattern may be interpreted differently according to a beam related to data or quasi-collocated (QCL) information. A set of rate matching patterns may be configured for each beam or for each QCL information, and according to the beam or QCL information indicated from DCI, a proper set of rate matching patterns may be selected for the rate matching.

In the case that different beams are used between a control signal and a data, a control symbol may be rate-matched, or different rate matching patterns may be used. Accordingly, the rate matching pattern may be configured for each beam or for each RS in QCL relation or for each TRP or for each CSI-RS or for each SS block. According to beam information indicated for data transmission, a set of rate matching patterns may be used. Each rate matching pattern may indicate one or more applicable beam or RS in QCL relation or SS block.

As a resource set related to rate matching, the following two types may be considered.

(1) Type 1: A set of PRBs or RBGs may be considered in a frequency domain. In a slot, one or more symbols may be applied. That is, a resource set of frequency and time domain may be configured in resource allocation type. Such a resource set may have a period and an offset. For example, in a normal subframe, the entire PRBs may be rate-matched in the first 1 to 3 symbols, and in a multicast broadcast single frequency network (MBSFN) subframe, the entire PRBs may be rate-matched in the first 1 to 2 symbols. For this, the rate matching pattern for 1 to 3 symbols may be configured e.g., for every 10 ms and the corresponding rate matching pattern may be applied only to the normal subframe. In addition, the rate matching pattern for 1 to 2 symbols may be configured e.g., for every 10 ms, and the corresponding rate matching pattern may be applied only to the MBSFN subframe. As another example, for the CORESET, a period of slot may be used. In the mini-slot scheduling, considering different frequency and symbol, one or more resource set may be configured with different CORESETs. As another example, a PUCCH resource and an SRS resource may be configured with a specific period.

(2) Type 2: A configuration of RS pattern may be considered. For example, a CSI-RS configuration may be considered together with a period and an offset.

For semi-static resource set, the UE may apply the rate matching on a union of the configured resource sets. The resource set may be configured in cell-specific manner (e.g., by RMSI or OSI). Before the resource set is configured, the UE may assume that there is no rate matching resource. In addition, for the purpose of LTE-NR coexistence, a preconfigured basic resource may be configured. This is designed for avoiding LTE PDCCH region. At this time, the LTE PDCCH region may have a maximum size, or two symbols may be reserved for LTE-NR sharing. That is, at least one bit may be used in RMSI or OSI such that a specifically predefined resource set is to be usable or unusable. For example, the resource set may be predefined as below.

Every 2 symbols may be reserved in each slot (for LTE-NR coexistence).

Every 3 symbols may be reserved in each slot (for LTE-NR coexistence).

Every 1 symbol may be reserved for SRS in each slot.

CRS may be reserved based on an antenna port or vshift value in each slot.

The predefined resource set may not be an optimal but may be one of a method for recovering the reserved resource.

After an RRC connection, the UE may be configured with a set of reserved resources. Between a set of reserved resources configured in cell-specific manner and a set of reserved resources configured in UE-specific manner, the UE operation may follow the followings.

Regardless of a configuration of the UE-specific reserved resource, the cell-specific reserved resource may be applied first, and then, the UE-specific reserved resource may be applied. That is, a union of the cell-specific reserved resource and the UE-specific reserved resource may be applied.

In the case that the UE is configured with the UE-specific reserved resource, the cell-specific reserved resource may be disregarded unless it is configured to UE again. That is, the UE-specific reserved resource is prior to the cell-specific reserved resource. Alternatively, UE-specific rate matching pattern/set may be applied to a control signal/data scheduled in UE-specific manner, and the cell-specific rate matching pattern/set may be applied to a control signal/data scheduled in cell-specific manner. It may be indicated whether the set of resources configured in cell-specific manner is applied to the UE-specific control signal/data. For example, SS block or a resource configured in cell-specific manner like other resource may be applied to the UE-specific control signal/data. Accordingly, it may be configured/indicated for the UE to inherit the set of reserved resources which is configured in cell-specific.

The cell-specific reserved resource may be used until the UE-specific reserved resource is configured. When the UE-specific reserved resource is configured, regardless of whether it is unicast/broadcast data, only the UE-specific reserved resource may be applied, or different reserved resources may be applied to the unicast/broadcast data.

Many resource sets may be present, which represent different resources for the rate matching. It is inefficient to indicate each resource set in L1 signaling. That is, a resource which is not dynamically changed may be present (e.g., SRS or PDCCH in LTE), such a resource may not be required to be indicated with L1 signaling. In addition, except the resource only configured semi-statically, many resource sets in which scheduled data are not overlapped in time and/or frequency domain may be present. For example, in the case that a specific resource set may have the rate matching pattern only at the second slot in every 10 slots, in the remaining 9 slots, it may be resource waste to indicate the corresponding resource set. Accordingly, it may be considered to group the resource sets in a similar way of non-periodic CSI-RS report for L1 signaling. Table 1 represents an example of grouping 16 rate matching resource sets (RMR1, RMR2 . . . RMR16).

TABLE 1

| State | RMR set |
| --- | --- |
| 0 | RMR1, RMR2 |
| 1 | RMR1, 2, 3, 4, |
| 2 | RMR 1, 4, |
| 3 | RMR 1-16 |
| 4 | RMR 7-16 |
| 5 | RMR 2, 4, 6, 8 |
| 6 | RMR 15, 16 |
| 7 | RMR 1-6 |

For example, RMR1 to 4 may be represented by a combination of three different CORESETs, and this may be indicated by state 0, 1 or 2. In addition, different combinations in which different resource sets are combined may be indicated. For such an indication, actual application of each resource set may follow period/offset and resource mapping configuration of each resource set. In order to minimize an unnecessary signaling for the resource set outside of an active BWP, a mapping table between a state and a resource set may be indicated by L1 signaling for each BWP. That is, the resource set may be configured differently for each BWP. In order to minimize overhead, the entire sets may be configured for each cell, and the mapping between a state and a resource set may be configured for each BWP.

In addition, when the CORESET configured to the UE is one of the rate matching resource sets, a period and/or an offset or a slot to which the corresponding rate matching resource set may be applied and/or a set of symbols may be defined as below.

A slot and/or a symbol configured such that at least one search space set associated with the corresponding CORESET is monitored may be regarded as a slot and/or a symbol to which the corresponding rate matching resource set is applied.

In the case that the UE does not monitor any search space in a slot or symbol associated with the corresponding CORESET, it may be regarded that the corresponding rate matching resource set is not valid or not applied.

That is, the rate matching pattern may be defined by a configuration for monitoring a search space set associated with the CORESET. Alternatively, in the case that a resource set indicates the CORESET, the CORESET may be configured together with a period and an offset for the purpose of the rate matching resource set.

The proposal related to the rate matching pattern described above may be applied in similar manner for an RS pattern. That is, the RS pattern is configured, and each state may correspond to a combination of a configuration of one or more RS patterns. In addition, the RS pattern configuration and the resource set of PRB level may be combined by a state and indicated in L1 signal.

6. Rate Matching Pattern and Detailed Indication Method

A design for the rate matching pattern may be as below. The UE may be configured with one or more resource sets, and the configuration therefor may include at least one of the following information.

RE pattern in a slot or time and/or frequency resource based on a resource allocation type indication in the slot (extendable for a plurality of slots)

Period during which the rate matching pattern is valid: At this time, an offset may be configured together. In the case that the rate matching pattern is applied to each slot, the information may be omitted.

Resource index: In the case that a bit number for the UE to indicate the rate matching pattern set dynamically is restricted, the resource index may be used for selecting the restricted resource set only. That is, in the case that the number of resource sets is greater than that of indicated by DCI field, only a part thereof may be selected based on the resource index.

Based on period/offset information and a position of the rate matching pattern (e.g., the rate matching pattern is not valid in the case of not overlapped with data scheduling), the applied rate matching pattern may be dynamically derived. In addition, the applied rate matching pattern may be derived based on TRP for data transmission/reception. Since all of them may be determined based on a slot index and/or timing information and/or scheduling information, a set of valid resources may be selected and arranged based on the resource index described above. In addition, a list of the resource sets is generated in the order, and a virtual identifier (ID) may be provided from 0 to N for each resource set. N may be determined by a maximum bit size of DCI field. When the DCI field uses a bitmap, N may be bitmap size-1. When the DCI field uses an index for indicating a resource set, N may be $2^k-1$. K may be a size of the DCI field.

In summary, a set of dynamic rate matching pattern may be derived based on a resource set configuration. Alternatively, a set of dynamic rate matching pattern may be derived based on scheduling information (e.g., time/frequency domain resource, TRP, a CORESET carrying DCI, etc.). Different resource set may be configured for each CORESET, different list may be used for DCI according to a CORESET that schedules. Alternatively, a slot in active BWP or a slot in a bandwidth that can be allocated, or N PRB*K slots may be divided into M grids. M may be indicated by individually indicated or combined. Alternatively, a position of the rate matching may be indicated in a time domain first, and later, a RE pattern applied in the respective time domain may be individually indicated. For the time domain indication, a bitmap or a set of patterns may be used.

7. Cell-Specific Rate Matching Pattern Configuration

In configuring a cell-specific rate matching pattern for future compatibility or LTE-NR coexistence, in order to minimize configuration overhead, the rate matching patterns of different type may be configured. The type of rate matching pattern may be configured as below.

(1) Type 1: In a defined bandwidth, only a frequency domain pattern may be configured. The frequency domain pattern may be in a unit of one or more RBs. The defined bandwidth may be positioned so that SS block is in a center, or applied to an initial DL BWP, or applied to a bandwidth indicated based on a common PRB indexing. The indicated PRB may be reserved for at least DL in all subframes/slots in which UL is scheduled. In the case that a frequency unit for the frequency domain pattern is not configured, a fixed value (e.g., 4 PRBs) may be used. The frequency unit for the frequency domain pattern may be defined for each frequency domain. For example, in a band below 6 GHz, the frequency unit may be 1 PRB, and in a band above 6 GHz, the frequency unit may be 100 PRBs or the entire system bandwidth. Alternatively, the frequency unit may be separately configured. For example, the frequency unit may be configured with 1 PRB or X PRB or the entirely applied the frequency domain.

(2) Type 2: In a bandwidth, only a time domain pattern may be configured. The time domain pattern may be in a unit of one or more symbols. The bandwidth may be defined explicitly or implicitly. In the case that the bandwidth is explicitly defined, the bandwidth may be defined according to one of the followings.

The bandwidth may be determined based on a center of SS block.
The bandwidth may be determined based on the lowest frequency of SS block.
The bandwidth may be determined based on a common PRB indexing from PRB 0.
The bandwidth may be determined based on an initial DL BWP (a center of initial DL BWP or the lowest PRB).
In at least SCell, the bandwidth may be determined based on a configured reference DL frequency.

It may also be indicated whether the rate matching pattern is applied. That is, a frequency position and a bandwidth may be configured.

In the case that the bandwidth is implicitly defined, the bandwidth may be defined according to one of the followings.

The bandwidth may be the same as an initial DL BWP.
The bandwidth may be the same as an initial DL BWP+SS block.
The bandwidth may be the same as a carrier bandwidth.
The bandwidth may be the same as a configured DL BWP.
The bandwidth may be prefixed for each frequency domain. For example, the bandwidth may be the same as UE minimum bandwidth for each frequency domain.
The bandwidth may be defined for each frequency domain. For example, the bandwidth may be K-multiple of UE minimum bandwidth.
The bandwidth may be the same as UE maximum bandwidth based on a reference DL frequency and/or a cell defining SS block.

(3) Type 3: Frequency/time domain pattern may be configured. The pattern of type 3 may be defined by frequency and time bitmap. The pattern of type 3 may be defined by a dense resource allocation in a frequency and a time. A plurality of configurations is also available.

(4) Type 4: Frequency-time domain pattern and period or time pattern may be configured. That is, together with type 1/2/3 described above, additional time pattern may be configured. Alternatively, another type in which all configurations are usable may be configured.

Considering time and frequency domain configuration including a unit, the description of the present disclosure described in type 1/2 may also be applied to type 3/4.

The rate matching pattern configuration configured for the UE may include the followings.

Type indication: The type indication may indicate one of types 1 to 3 described above. In addition, an additional time pattern may be configured. The additional time pattern may be applied without wrap-around from system frame number (SFN) 0 (i.e., applied from SFN 0 always). Alternatively, the time pattern may be applied with wrap-around (i.e., applied from SFN 0 absolutely). In addition, an additional frequency pattern may be configured. The additional frequency pattern may indicate whether it is applied from PRB 0 based on a common PRB indexing or applied from the indicated frequency position. Alternatively, the type indication may indicate one of types 1 to 3.
Bandwidth to which each configuration is applied for each type: A reference frequency position for applying a bandwidth may be additionally configured.
Symbol unit and frequency unit for each type: As described above, a default value may also be used.

According to the information, a size of configuration of each rate matching pattern may be determined.

Considering LTE-NR coexistence, there is a use case in which a cell-specific signaling is particularly beneficial in the case that a resource allocation unit is not enough to process a reserved resource. For example, it has been discussed that a reserved resource is indicated in RB level in the case that narrowband internet-of-things (NB-IoT) and NR are coexisted, and as another example, in the case of LTE-NR coexistence, a PDCCH region of LTE may be signaled as the reserved resource. Considering that either one of a reserved resource of a frequency domain or a reserved resource of a time domain may be enough for the two cases, bitmap-1 or bitmap-2 may be configured in simple manner. In the case that the use case in which bitmap-1 and bitmap-2 are combined is distinguished, combination of bitmap-1 and bitmap-2 may be supported. When only bitmap-1 is configured, the indicated RB may be applied to all symbols in all slots. In the case that only bitmap-2 is configured, the indicated symbol may be deferred in the entire frequencies.

8. Semi-Static Rate Matching Resource

In relation to the rate matching, the following two different resource sets (hereinafter, this is called a semi-static rate matching resource) may be configured. The first resource set is a reserved resource/rate matching resource set configured semi-statically which is to be rate-matched for a control signal/a data. The second is a resource set in which it is dynamically indicated whether the rate matching is performed, or data is mapped. First, for the reserved resource/rate matching resource set configured semi-statically, like the resource for LTE resource or future compatibility in the LTE-NR coexistence, there is a case that the reserved resource is not used for DL, UL and measurement. In order to handle intermodulation distortion (IMD), it is considered to use TDM between two UL carriers or between DL carrier and UL carrier. However, in the case that TDM is used in NR, a resource in which measurement configuration and scheduling are not allocated may be processed, and accordingly, inefficiency may occur in a periodic aspect such as CSI-RS, SRS, and the like. Accordingly, in such a case, it may be preferable that a reserved resource is configured for each of DL and UL, and the reserved resource may be used in DL or UL. In addition, for the semi-static rate matching resource set for a periodic RS mapping like a periodic wideband RS, CSI-RS and SRS may be applied for DL and UL, respectively.

A resource unit of the semi-static rate matching resource set is required to be flexibly configured so as to support various use cases. For the reserved resource, a resource set may be configured with a plurality of symbols on a consecutive frequency domain. The frequency domain may be enough that a plurality of resource sets is configured to support non-consecutive resource in a time and/or a frequency domain. For the semi-static resource configuration in RE level, the existing RS configuration (e.g., period, RE configuration, etc.) may be used.

In order to minimize configuration overhead, to simplify the rate matching operation and not to complexity the TBS function, the followings may be suggested for the semi-static rate matching resource.

A reserved resource for which the UE expects that transmission/reception/measurement is not performed may be configured. A unit of resource may be one or more symbols on consecutive PRBs in a frequency domain.

The rate matching resource may be configured for each of DL and UL. The resource unit or resource configuration may include one or more symbols on consecutive PRBs in a frequency domain or include one or more RS configurations (e.g., CSI-RS and SRS).

9. Dynamic Rate Matching Resource Considering PDCCH

As described above, one or more resource sets may be semi-statically configured, and one or more of them may be indicated dynamically for multiplexing at least a control signal/a data. For the convenience, the resource set dynamically indicated may be called dynamic rate matching resource set type-1. The dynamic rate matching resource set type-1 may be valid only when a scheduled PDSCH is partially or completely overlapped with a configured/indicated resource set. More particularly, the scheduled PDSCH is TDMed with the configured/indicated resource set, the resource set may not influence on a physical resource mapping of PDSCH transmission. As such, when the scheduled PDSCH is not overlapped with a configured/indicated resource set, it is required to define clearly how to interpret L1 signaling for PDSCH mapping. In this case, in order to simplify an operation, a bit field for the PDSCH mapping may be configured as a default value, and the corresponding field may be used as a virtual cyclic redundancy check (CRC) to improve a detection performance of PDCCH.

Meanwhile, the rate matching may be performed in a resource set indicated on the dynamic rate matching resource set type-1 or PDSCH/PUSCH may be mapped to the indicated resource set, and it may be preferable that the rate matching may be performed in the indicated resource set. This is because, an unnecessary restriction on RRC configuration, RRC signaling overhead and an additional procedure are required to define which DL resource may be used for PDSCH mapping such that PDSCH/PUSCH is mapped to the indicated resource set.

Figure 9:
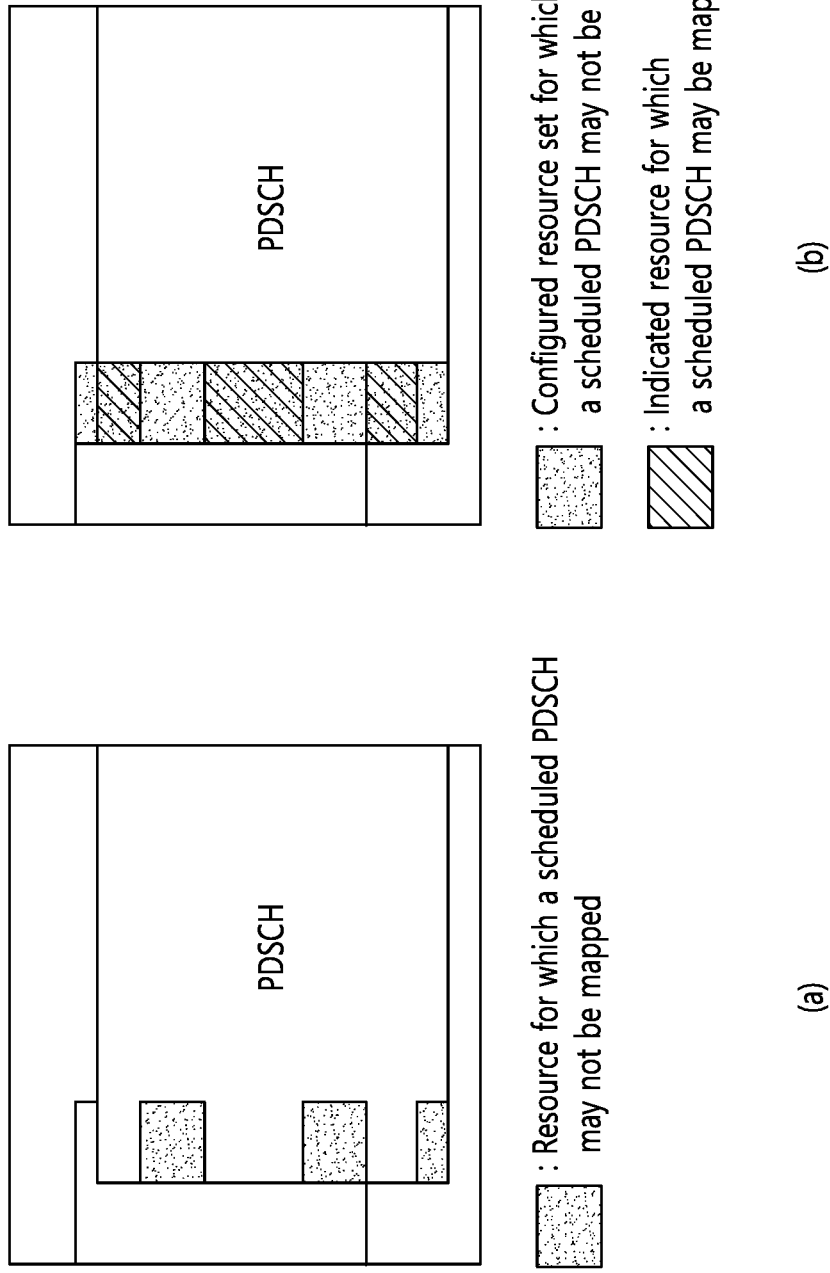
FIG. 9 shows an example of the rate matching according to an embodiment of the present disclosure.

FIG. 9 shows an example of the rate matching according to an embodiment of the present disclosure. FIG. 9-(*a*) shows the case that the rate matching is performed in the resource set indicated on the dynamic rate matching resource set type-1. Referring to FIG. 9-(*a*), only a single resource set to which a PDSCH may not be mapped may be configured through RRC. On the other hand, FIG. 9-(*b*) shows the case that a PDSCH is mapped in the resource set indicated on the dynamic rate matching resource set type-1. Referring to FIG. 9-(*b*), both the resource set to which a PDSCH may not be mapped and the resource set to which a PDSCH may be mapped as a result of PDSCH mapping should be configured. That is, it is required to be clearly defined additionally which resource set is rate-matched first such that a PDSCH is mapped in the resource set indicated on the dynamic rate matching resource set type-1.

As for L1 signaling for the dynamic rate matching resource set type-1, a group-common signaling and UE-specific signaling may be used. Since different UE may have different rate matching pattern, it may be preferable to indicate the dynamic rate matching resource set type-1 through the UE-specific signaling. In the case that a rate matching resource set includes RS like CSI-RS or a dynamic reserved resource by beamforming as well as CORESET, it may be preferable to indicate different rate matching pattern for each UE. In addition, considering ambiguity additionally, it may be preferable that scheduling DCI includes information for the rate matching. In other words, the DL resource used for a PDSCH transmission may be allocated by a single L1 signaling used for scheduling a single PDSCH transmission, rather than a plurality of L1 signaling. When a plurality of resource sets including a combination of resource sets is configured, it may be considered whether all configured resource sets are indicated through a bitmap or only a single resource set of them is indicated. In order to minimize overhead, a single resource set of the configured resource sets may be indicated. According to a network configuration, all combinations of a basic resource unit may not be supported. Accordingly, it is more flexible and minimizes overhead to indicate a single resource set of the configured resource sets.

Similarly, dynamic resource sharing may be supported between different signals such as PUSCH and PUCCH. More particularly, the UE may be configured to distinguish a resource in which a PUSCH is mapped or not mapped based on L1 signaling by a UE-specific RRC signaling. The resource set may include a PUCCH resource for the same UE or different UE. That is, in order to indicate one or more resource sets in which a scheduled PDSCH or PUSCH is rate-matched, UE scheduling may be used.

A resource unit of the dynamic rate matching resource set type-1 may correspond to one of the followings.

(1) CORESET level
(2) REG/CCE/PDCCH candidate level
(3) Frequency domain allocation of PRB/RBG level which may be non-consecutive and one or more symbols A resource allocation in CORESET level may be configured by considering a PDCCH candidate, an amount of DL/UL traffic and a PDCCH detection performance. An amount of DL resource which is used for actual PDCCH transmission may be relatively smaller than an amount of the entire DL resources which are associated with the CORESET. That is, depending on a traffic condition, the resource allocation in CORESET level may not use the usable resources in the CORESET for a PDSCH mapping completely.

In the case of a resource allocation in REG/CCE/PDCCH candidate level, depending on a configured/indicated resource set, a part of DL resource of the CORESET may be re-used for a PDSCH mapping. For example, a specific CCE index may be configured as a threshold value for distinguishing a usable DL resource for a PDSCH mapping. More particularly, for a given CORESET, in the case that a configured index of CCE threshold value is X, a scheduled PDSCH may be rate-matched in periphery of a DL resource associated with a CCE of which index is smaller than X rather than all DL resources in the CORESET. Meanwhile, a PDCCH transmission of the same UE or different UE may be mapped to the CCE of which index is smaller than X. In this case, the resource set may be configured according to a combination of the CORESET and the threshold value. That is, it may be efficient to reuse a DL resource in the CORESET together with a reasonable signaling overhead.

However, the dynamic rate matching resource set may also be used for another purpose except for multiplexing of a control signal/a data. The dynamic rate matching resource set may be used for dynamic resource reservation/use. In this case, a configuration of the dynamic rate matching resource set may not be restricted by a control region only. That is, in order to adjust configuration overhead and improve flexibility, a resource unit for the dynamic rate matching resource set type-1 may be configured with frequency domain allocation of PRB/RBG level which may be non-consecutive and one or more symbols, similar to the semi-static rate matching resource set.

10. Rate Matching Resource Considering RS

In addition to the dynamic rate matching resource set considering a PDCCH, i.e., the dynamic rate matching resource set type-1, a rate matching resource set for guarding an RS in NR may be supported. For the convenience of description, the resource set which is dynamically indicated for an RS may be called a dynamic rate matching resource set type-2. The biggest difference between the dynamic rate matching resource set type-1 and the dynamic rate matching resource aggregation set-2 is: as a resource unit, it is enough with a configuration in RB level for the dynamic rate matching resource set type-1, but a configuration in RE level is required for the dynamic rate matching resource set type-2.

Meanwhile, the dynamic rate matching resource for a PDSCH may include at least CSI-RS. Considering that a PDSCH may be multiplexed with a DM-RS in FDM scheme, in NR, in order to guard a DM-RS of other UEs, a signaling for the rate matching of a PDSCH needs to be supported in a DM-RS symbol. Since an integrated configuration and signaling is preferable for the rate matching purpose, a configuration of the rate matching resource set for a PDSCH may be supported with a DM-RS as well as a CSI-RS.

In addition, a resource for a PUSCH rate matching may be supported. Similar to LTE, a configuration for UL rate matching resource set in at least symbol level may be supported for guarding SRS. However, for more improved flexibility than LTE, in addition to a symbol level configuration, it may be considered a band configuration and a RE level configuration for the UL rate matching resource set. Particularly, when a band configuration for the UL rate matching resource set is introduced, a hopping of the UL rate matching resource set may also be introduced by considering an SRS hopping band.

Meanwhile, a data may not be transmitted in a RE in which non-zero-power (NZP) CSI-RS for a channel measurement is transmitted for at least channel measurement capability. Accordingly, it may be regarded that the NZP CSI-RS for measuring all configured channels may be rate-matched, basically. Similar to a RE position of the NZP CSI-RS for a channel measurement, a PDSCH and a PUSCH may be rate-matched in periphery of the RE which is occupied by an important a part of signals for data transmission/reception. For example, a PDSCH needs to be rate-matched in periphery of scheduled DM-RS and SS block, and a PUSCH needs to be rate-matched in periphery of scheduled DM-RS and SRS.

Figure 10:
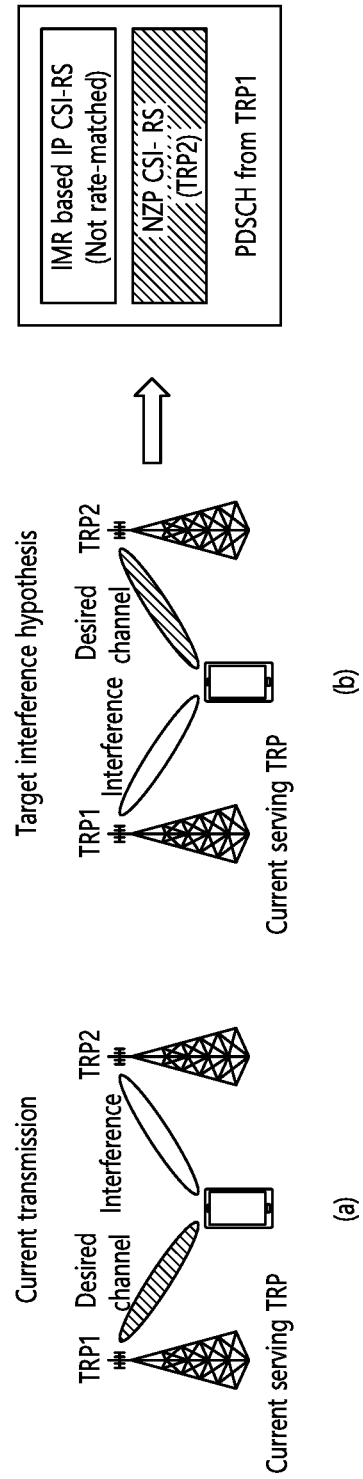
FIG. 10 shows another example of the rate matching according to an embodiment of the present disclosure.

FIG. 10 shows another example of the rate matching according to an embodiment of the present disclosure. In an aspect of an interference measurement resource (IMR), in order to support a plurality of TRPs, a dynamic indication of the IMR is required. Referring to FIG. 10, in the IMR based on a specific ZP CSI-RS, a data transmitted from a current serving TRP is measured as interference, and according to a desired channel measured on NZP CSI-RS from a future serving TRP, dynamic point selection (DPS) CSI may be configured. Therefore, not all rate matching resource sets are required to be measured, and not all ZP CSI-RS based IMR are required to be rate-matched.

In summary, in order to handle the fact that a data and various RSs are overlapped, it is required to clearly define a UE operation for a configured RS. That is, a PDSCH may be rate-matched in periphery of the following resources.

NZP CSI-RS configured for UE for channel measurement
DM-RS for PDSCH configured for UE
DL PT-RS and TRS configured for UE In addition, a PUSCH may be rate-matched in periphery of the following resources.

SRS configured for UE
DMRS for PUSCH configured for UE
UL PT-RS configured for UE The operation described above is rate-matched but does not require any configuration of a resource set which is dynamically indicated.

Meanwhile, in order to handle various RS configurations for a UE, an operation of different time domain of the dynamic rate matching resource set type-2 may be considered. For IMR based on NZP CSI-RS and ZP CSI-RS for a channel measurement, non-periodic/semi-persistent/periodic RS may be supported, and accordingly, in NR, it is required to define an operation regarding non-periodic/semi-persistent/periodic rate matching resource set in the same time domain. The periodic rate matching resource set may be used for guarding periodically transmitted CSI-RS and IMR in coordinated multi-point (CoMP) transmission scenario in which inter-cell interference is present. The non-periodic rate matching resource set is required for at least non-periodic CSI-RS and IMR. The semi-persistent rate matching resource set may be required for the case of NZP CSI-RS transmitted in semi-persistent manner in a neighbor TRP or beam. The non-periodic rate matching resource set indicated by DCI signaling may be used in an every corresponding PDSCH slot in a use of the semi-persistent rate matching resource set. However, in this case, overhead of DCI may increase for indicating all available combinations of rate matching resource sets including a target CSI-RS resource for the non-periodic and semi-persistent CSI-RS. This is particularly so considering that one or more semi-persistent rate matching resource sets are required to be triggered at the same time (in different periods, but in the same transmission instance) in a slot. The non-periodic rate matching resource set is required to be designed with a small DCI payload in order to indicate the rate matching resource set dynamically. The number of candidates of the rate matching resource set may be more reduced by media access control (MAC) control element (CE). The semi-persistent rate matching resource set may be activated/inactivated for the MAC CE.

For the periodic and semi-persistent rate matching resource set, a period and a slot offset may be configured by RRC in addition to RE pattern information (i.e., RE position in a slot). Since the non-periodic rate matching resource set may be used for dynamic RS guard for non-periodic CSI-RS of a neighboring UE/TRP, a period and a slot offset are not required for the non-periodic rate matching resource set. The non-periodic rate matching resource set may be triggered by DCI. In the case that a plurality of periodic/semi-persistent rate matching resource sets is configured, the periodic/semi-persistent rate matching resource set may be combined with DCI signaling for selecting one or more rate matching resource sets among the rate matching resource sets configured by RRC. Only in the case that scheduled PDSCH/PUSCH slot index is matched with a period and a slot offset of the rate matching resource set indicated by DCI and resource is activated (only for the semi-persistent rate matching resource set), PDSCH/PUSCH may be rate-matched in periphery of the configured periodic or semi-persistent rate matching resource set.

In summary, the following three types of rate matching resource sets may be supported for RS.

(1) Periodic rate matching resource set: A RE pattern (i.e., RE position in a slot), a period and a slot offset for the rate matching may be configured by RRC. PDSCH may be rate-matched in periphery of the configured resource.

(2) Semi-persistent rate matching resource set: A RE pattern (i.e., RE position in a slot), a period and a slot offset for the rate matching may be configured by RRC. MAC CE may activate/inactivate the corresponding resource. PDSCH may be rate-matched only in periphery of the activated resource among the configured resources.

(3) Non-periodic rate matching resource set: A RE pattern for the rate matching (i.e., the dynamic rate matching resource set type-2) may be configured by RRC. PDSCH may be rate-matched in periphery of the resource indicated by DCI.

Considering that the rate matching including a plurality of RS types (e.g., CSI-RS, DM-RS, SRS, etc.) may be performed, a RE pattern configuration method of the rate matching resource set is required to be defined. For this, the following options may be considered.

(1) Option 1: Reuse the configuration parameter indicating a RE position for each RS type A RE pattern configuration method of a target RS (e.g., CSI-RS, DM-RS, SRS, etc.) may be reused as a RE pattern configuration method of the rate matching resource set. For example, in the case of CSI-RS, similar to LTE, the rate matching resource set may be configured through CSI-RS RE pattern configuration index of X antenna port. This option is efficient in signaling aspect. For example, the candidate parameter for configuring the rate matching resource set may be as below.

NZP CSI-RS: a RE pattern (e.g., RE position, port number), an RB level density, a timing operation (i.e., periodic/semi-persistent/non-periodic), a period and a slot offset for the periodic/semi-persistent rate matching resource set DM-RS: a DM-RS type, a DM-RS symbol index and a number, a code division multiplexing (CDM) group index (particularly, for type 2), an additional DM-RS configuration SRS: a RE pattern (e.g., RE position, port number), a comb value, a frequency hopping, a timing operation (i.e., periodic/semi-persistent/non-periodic), a period and a slot offset for the periodic/semi-persistent rate matching resource set, a band configuration However, considering that a new RS type may be added in a future release or a new RE pattern may be added in a current RS type, this option may be restrictive in future compatibility.

(2) Option 2: RE pattern configuration through a bitmap

In this option, independently from the configuration method of each RS type, a RE pattern of the rate matching resource set may be freely configured. This option may overcome the restriction of option 1. However, this option requires greater signaling overhead. For example, in the case that a RE level bitmap is used for the rate matching resource set configuration, 168 bits are required to completely support a PRB of 14 symbols. Such an overhead may be more increased when the RE pattern of the rate matching resource set is configured throughout a plurality of consecutive PRBs. Accordingly, in this option, it is required a method for reducing signaling. For example, it may be required the rate matching resource set element resource having N neighboring REs, the rate matching resource set in a symbol level, a configuration of the rate matching resource set in a limited region, and the like.

11. Common Framework for an Indication of the Rate Matching Resource Set A resource configured for a physical resource mapping of a PDSCH transmission may include CORESET/PDCCH of another UE a dynamic reserved resource such as an RS of another UE and a resource using different numerologies. That is, a pattern of resource set needs to consider not only CORESET/PDCCH of another UE but also another resource unusable by the corresponding UE. That is, a DCI indication for the rate matching resource set may be used for a plurality of uses. Simply, a single bit field may be used for indicating a combination of rate matching resource sets for a plurality of uses. In such a case, a resource set for dynamic indication of the rate matching resource set may be configured according to a combination of a CORESET configuration (in PRB aspect) and CSI-RS configuration (in RE pattern aspect). More generally, the resource set for dynamic indication of the rate matching resource set may be configured in PRB and/or RE group level admitting signaling overhead. Each candidate of the rate matching resource set may include a resource for PDCCH and a resource for CSI-RS. However, since a PDCCH and a CSI-RS are independently generated, an indication for the resource for PDCCH and an indication for the resource for CSI-RS are required to be independent. For example, a PDSCH needs to be rate-matched in periphery of a resource, but a PDCCH may be mapped without being rate-matched in periphery of CSI-RS resource. Alternatively, an individual bit field may be used for indicating the rate matching resource set for each purpose such as a resource sharing between a PDCCH and a PDSCH or a RS guard. In such a case, each candidate of the rate matching resource set may be associated with the rate matching resource set that shares a resource with a PDCCH and the rate matching resource set for RS guard. Followings represents several options that integrates the rate matching resource sets.

(1) Option 1: An individual field or indication may be used according to a resource configuration unit. For example, the dynamic rate matching resource set type-1 and the dynamic rate matching resource set type-2 may be individually indicated.

(2) Option 2: An individual field or indication may be used according to a symbol in which the rate matching is performed. For example, a field may be used for a symbol in which a control region is existed, and another field may be used for a data.

(2) Option 3: An individual field or indication may be used according to a purpose. For example, control signal/data multiplexing and non-periodic IMR indication may use different fields. In addition, in the case that another resource set such as dynamic resource reservation is required, another individual field may be used.

Figure 11:
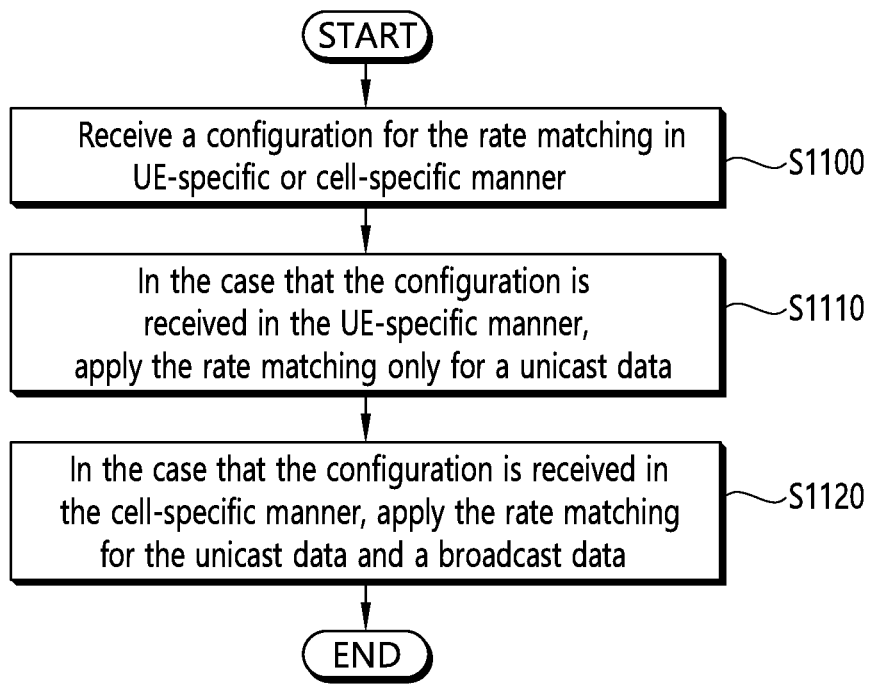
FIG. 11 shows a method for a UE to perform the rate matching according to an embodiment.

FIG. 11 shows a method for a UE to perform the rate matching according to an embodiment. The description of the present disclosure related to the rate matching may be applied to this embodiment.

In step S1100, a UE receives a configuration for the rate matching in UE-specific or cell-specific manner. The configuration may include a plurality of rate matching patterns, and at least one rate matching pattern among the plurality of rate matching patterns may be indicated by dynamic signaling. The plurality of rate matching patterns may include a set of each of the symbols. The configuration may include the respective period and offset of the plurality of rate matching patterns or information for the bandwidth in which the rate matching is performed.

The plurality of rate matching patterns may include a common rate matching pattern which is applicable to all configured BWPs. The common rate matching pattern may be configured based on a reference numerology. Alternatively, the plurality of rate matching patterns may be configured for each BWP. In this case, the plurality of rate matching patterns may be configured based on the numerology which is used for each BWP. In addition, each of the plurality of rate matching patterns may be configured for each slot and repeated in a plurality of slots.

In step S1110, in the case that the configuration is received in the UE-specific manner, the UE performs the rate matching only for a unicast data. In step S1120, in the case that the configuration is received in the cell-specific manner, the UE performs the rate matching for the unicast data and a broadcast data. The rate matching pattern may be performed in a slot in which a PDSCH or a PUSCH is scheduled according to the at least one rate matching which is indicated by the dynamic signaling. The DM-RS transmitted in the PDSCH or PUSCH may not be influenced by the rate matching pattern. In addition, the DCI that schedules the PDSCH or PUSCH may also not be influenced by the rate matching pattern.

Figure 12:
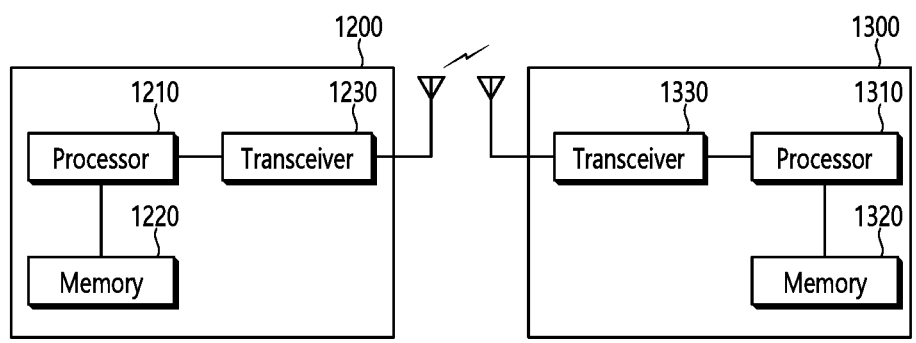
FIG. 12 shows a wireless communication system in which an embodiment of the present disclosure is implemented.

The rate matching may be performed based on slot based or mini-slot based manner. FIG. 12 shows a wireless communication system in which an embodiment of the present disclosure is implemented.

A UE 1200 includes a processor 1210, a memory 1220 and a transceiver 1230. The memory 1220 is connected to the processor 1210 and stores various types of information to drive the processor 1210. The transceiver 1230 is connected to the processor 1210 and transmits a radio signal to a network node 1300 or receives a radio signal from the network node 1300. The processor 1210 may be configured to implement the function, the procedure and/or the method described in the present disclosure. More particularly, the processor 1210 may perform steps S1100 to S1120 in FIG. 11 or control the transceiver 1230 to perform it.

The network node 1300 includes a processor 1310, a memory 1320 and a transceiver 1330. The memory 1320 is connected to the processor 1310 and stores various types of information to drive the processor 1310. The transceiver 1330 is connected to the processor 1310 and transmits a radio signal to the UE 1200 or receives a radio signal from the UE 1200. The processor 1310 may be configured to implement the function, the procedure and/or the method described in the present specification.

The processors 1210 and 1310 may include application-specific integrated circuit (ASIC), other chipset, logic circuit and/or data processing device. The memories 1220 and 1320 may include read-only memory (ROM), random access memory (RAM), flash memory, memory card, storage medium and/or other storage device. The transceivers 1220 and 1320 may include baseband circuitry to process radio frequency signals. When the embodiments are implemented in software, the techniques described herein can be implemented with modules (e.g., procedures, functions, and so on) that perform the functions described herein. The modules may be stored in memories 1220 and 1320 and executed by processors 1210 and 1310. The memories 1220 and 1320 may be implemented within the processors 1210 and 1310 or external to the processors 1210 and 1310 in which case those can be communicatively coupled to the processors 1210 and 1310 via various means as is known in the art.

Figure 13:
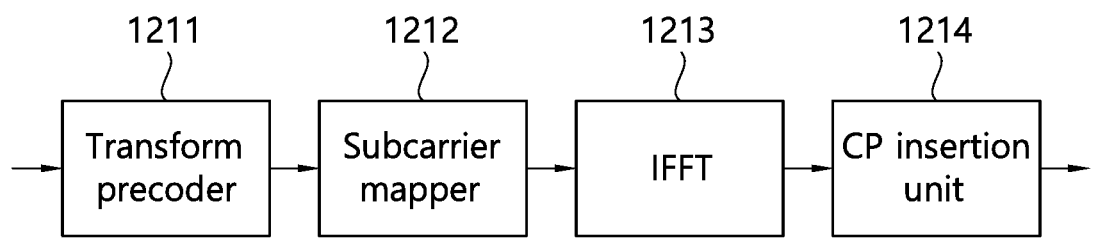
FIG. 13 shows a processor of a UE shown in FIG. 12.

FIG. 13 shows a processor of a UE shown in FIG. 12. The processor 1210 of the UE may include a transform precoder 1211, a subcarrier mapper 1212, an inverse fast Fourier transform (IFFT) unit 1213, and a cyclic prefix (CP) insertion unit (1214).

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for a wireless device in a wireless communication system, the method comprising:

receiving, from a network, a set of rate matching patterns, wherein each of the rate matching patterns includes a set of symbols, in at least one slot, to which rate matching is applied, and wherein resources at each of the set of symbols to which the rate matching is applied is indicated by a bitmap which has a size of a maximum scheduling unit with which the wireless device can be scheduled;

receiving, from the network, information informing at least one rate matching pattern from among the set of rate matching patterns;

applying the rate matching on a data channel around resources at each of the set of symbols included in the at least one rate matching pattern; and receiving, from the network, data on the data channel.

2. The method of claim 1, wherein the rate matching is applied per each of the set of symbols.

3. The method of claim 1,
wherein the resources at each of the set of symbols included in the at least one rate matching pattern is not available for the data channel.

4. The method of claim 1, wherein a demodulation reference signal (DM-RS) is received on the data channel in the resources at each of the set of symbols included in the at least one rate matching pattern.

5. The method of claim 1, wherein downlink control information (DCI) scheduling the data channel is received in the resources at each of the set of symbols included in the at least one rate matching pattern.

6. The method of claim 1, wherein the data includes a unicast data.

7. The method of claim 1, wherein the data does not a broadcast data.

8. The method of claim 1, wherein the set of rate matching patterns is received per bandwidth part (BWP).

9. The method of claim 8, wherein the set of rate matching patterns is received based on a numerology used per BWP.

10. A wireless device in a wireless communication system, the wireless device comprising:

a memory;

a transceiver; and a processor coupled to the memory and the transceiver, wherein the wireless device is configured to:

receive, from a network via the transceiver, a set of rate matching patterns, wherein each of the rate matching patterns includes a set of symbols, in at least one slot, to which rate matching is applied, and wherein resources at each of the set of symbols to which the rate matching is applied is indicated by a bitmap which has a size of a maximum scheduling unit with which the wireless device can be scheduled;

receive, from the network via the transceiver, information informing at least one rate matching pattern from among the set of rate matching patterns;

apply the rate matching on a data channel around resources at each of the set of symbols included in the at least one rate matching pattern; and receive, from the network via the transceiver, data on the data channel.

11. The method of claim 1, wherein the wireless device is in communication with at least one of a mobile device, a network, and/or autonomous vehicles other than the wireless device.

* * * * *